US012777353B2

(12) United States Patent
Karabulut et al.

(10) Patent No.: US 12,777,353 B2
(45) Date of Patent: Oct. 27, 2026

(54) APPARATUS, METHOD, AND COMPUTER PROGRAM

(71) Applicant: Nokia Technologies Oy, Espoo (FI)

(72) Inventors: Umur Karabulut, Munich (DE); Ahmad Awada, Munich (DE); Panagiotis Spapis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 418 days.

(21) Appl. No.: 18/490,494

(22) Filed: Oct. 19, 2023

(65) Prior Publication Data

US 2024/0155397 A1 May 9, 2024

(30) Foreign Application Priority Data

Nov. 3, 2022 (FI) ...................................... 20225987

(51) Int. Cl.
*H04W 24/10* (2009.01)
*H04W 48/16* (2009.01)

(52) U.S. Cl.
CPC ........... *H04W 24/10* (2013.01); *H04W 48/16* (2013.01)

(58) Field of Classification Search
CPC .............................. H04W 48/16; H04W 24/10
See application file for complete search history.

(56) References Cited

U.S. PATENT DOCUMENTS

2016/0037425 A1 2/2016 Van Lieshout et al.
2020/0229262 A1* 7/2020 Jung ..................... H04W 24/10
2022/0022121 A1 1/2022 Eklof et al.
2022/0264346 A1* 8/2022 Damnjanovic ....... H04W 24/10
2022/0264383 A1 8/2022 Tayeb et al.
2024/0007958 A1* 1/2024 Kim .................... H04W 52/146
2024/0334263 A1* 10/2024 Zhang ............... H04W 36/0061
2025/0119810 A1* 4/2025 Gürsu ................ H04W 36/305
2025/0227577 A1* 7/2025 Jia ...................... H04W 36/0058
2025/0344125 A1* 11/2025 Yan ..................... H04W 36/305
2025/0350981 A1* 11/2025 Wang .................... H04W 24/10

FOREIGN PATENT DOCUMENTS

WO 2022/151077 A1 7/2022
WO 2022/151208 A1 7/2022

OTHER PUBLICATIONS

Office action received for corresponding European Patent Application No. 23205577.2, dated Feb. 5, 2025, 8 pages.
"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.

(Continued)

*Primary Examiner* — Deepa Belur
(74) *Attorney, Agent, or Firm* — BURR & FORMAN LLP

(57) ABSTRACT

There is provided a method, apparatus, and computer program for causing a centralized unit of a radio access network to perform: signalling, to a distributed unit of the radio access network, a layer 1 measurement reporting configuration to be executed by a user equipment as part of a lower layer mobility procedure and at least one activation condition for autonomous execution of the layer 1 reporting configuration.

17 Claims, 11 Drawing Sheets

(56) References Cited

OTHER PUBLICATIONS

"3rd Generation Partnership Project; Technical Specification Group Radio Access Network; NR; Requirements for support of radio resource management (Release 17)", 3GPP TS 38.133, V17.3.0, Sep. 2021, 3206 pages.
"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.
"Revised WID on Further NR mobility enhancements", 3GPP TSG RAN Meeting #96, RP-221799, Agenda: 9.3.2.1, MediaTek Inc, Jun. 6-9, 2022, 5 pages.
Karabulut, "FR2 Reference Mobility Simulations", Nokia, May 21, 2021, pp. 1-110.
"L1/L2 Mobility Considerations", 3GPP TSG-RAN WG2 Meeting #119-bis-e, R2-2209701, Agenda: 8.4.2, Qualcomm Incorporated, Oct. 10-19, 2022, pp. 1-6.
"3rd Generation Partnership Project; Technical Specification Group Radio Access Network; NR; Physical layer procedures for control (Release 16)", 3GPP TS 38.213, V16.2.0, Jun. 2020, pp. 1-176.
"3rd Generation Partnership Project; Technical Specification Group Radio Access Network; NG-RAN; F1 application protocol (F1AP) (Release 17)", 3GPP TS 38.473, V17.2.0, Sep. 2022, pp. 1-683.
"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.
"3rd Generation Partnership Project; Technical Specification Group Radio Access Network; NR; Physical layer measurements (Release 17)", 3GPP TS 38.215, V17.2.0, Sep. 2022, pp. 1-26.
"3rd Generation Partnership Project, Technical Specification Group Radio Access Network; NR; Physical channels and modulation (Release 17)", 3GPP TS 38.211, V17.3.0, Sep. 2022, pp. 1-136.
"3rd Generation Partnership Project; Technical Specification Group Radio Access Network; NR; User Equipment (UE) radio transmission and reception; Part 1: Range 1 Standalone (Release 17)", 3GPP TS 38.101-1, V17.7.0, Sep. 2022, 723 pages.
"3rd Generation Partnership Project; Technical Specification Group Radio Access Network; NR; User Equipment (UE) radio transmission and reception; Part 2: Range 2 Standalone (Release 17)", 3GPP TS 38.101-2, V17.7.0, Sep. 2022, pp. 1-217.
"3rd Generation Partnership Project; Technical Specification Group Radio Access Network; NR; User Equipment (UE) radio transmission and reception; Part 3: Range 1 and Range 2 Interworking operation with other radios (Release 17)", 3GPP TS 38.101-3, V17.7.0, Sep. 2022, pp. 1-1131.
Office action received for corresponding Finnish Patent Application No. 20225987, dated Apr. 3, 2023, 16 pages.
Extended European Search Report received for corresponding European Patent Application No. 23205577.2, dated Apr. 18, 2024, 12 pages.
"Solutions for L1/L2 based inter-cell mobility", 3GPP TSG-RAN WG2 #119-e, R2-2208201, Agenda: 8.4.2.2, Ericsson, Aug. 17-29, 2022, 15 pages.
"Prerequisites and benefits of Lower Layer Mobility", 3GPP TSG-RAN WG2 Meeting #119 Electronic, R2-2208212, Agenda: 8.4.2.1, Nokia, Aug. 17-26, 2022, 13 pages.
Office action received for corresponding European Patent Application No. 23205577.2, dated Mar. 11, 2026, 9 pages.

* cited by examiner

APPARATUS, METHOD, AND COMPUTER PROGRAM

FIELD OF THE DISCLOSURE

The examples described herein generally relate to apparatus, methods, and computer programs, and more particularly (but not exclusively) to apparatus, methods and computer programs for apparatuses.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to a first aspect, there is provided a method for a centralized unit of a radio access network, the method comprising: signalling, to a distributed unit of the radio access network, a layer 1 measurement reporting configuration to be executed by a user equipment as part of a lower layer mobility procedure and at least one activation condition for autonomous execution of the layer 1 reporting configuration.

The method may comprise signalling a layer 3 measurement reporting configuration to the distributed unit, the layer 3 measurement reporting configuring comprising an instruction for the user equipment to signal a measurement identifier for layer 3 measurement reports using a layer 2 header.

Said signalling the layer 1 measurement reporting configuration may comprise an instruction for the distributed unit to abstain from signalling the layer 1 measurement reporting configuration to the user equipment until an indication fulfilling at least one of the at least one activation conditions is received from the user equipment.

Said layer 1 measurement reporting configuration may comprise an instruction for the distributed unit to abstain from signalling the layer 1 measurement reporting configuration to the user equipment before an indication fulfilling at least one of the at least one activation conditions is received from the user equipment.

Said layer 1 measurement reporting configuration may comprise an instruction for the distributed unit to trigger execution of the layer 1 measurement reporting configuration at the user equipment after receipt at the distributed unit of the indication fulfilling at least one of the at least one activation conditions is received from the user equipment.

Said layer 1 measurement reporting configuration may comprise an instruction for the user equipment to autonomously execute the layer 1 measurement reporting configuration when at least one of the at least one activation conditions is fulfilled.

The method may comprise, after receiving, from the user equipment, an indication that at least one of the at least one activation conditions has been fulfilled: determining that a mobility procedure is to be performed for said user equipment; obtaining respective configurations for a set of target cells for the user equipment; generating a new layer 1 measurement reporting configuration using said respective configurations; and signalling said new layer 1 measurement reporting configuration to the distributed unit to be executed by the user equipment as part of a lower layer mobility procedure.

The method may comprise: receiving respective layer 1 measurement reporting configurations from a plurality of distributed units; and generating said layer 1 measurement reporting configuration using said received respective layer 1 measurement reporting configurations.

Said receiving respective layer 1 measurement reporting configurations may be performed when establishing respective interfaces between the distributed unit and the centralized unit.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a second aspect, there is provided a method for a distributed unit of a radio access network, the method comprising: receiving, from a centralized unit of the radio access network, a layer 1 measurement reporting configuration to be executed by a user equipment as part of a lower layer mobility procedure, and at least one activation condition for autonomous execution of the layer 1 reporting configuration.

The method may comprise: receiving a layer 3 measurement reporting configuration comprising an instruction for the user equipment to signal a measurement identifier for layer 3 measurement reports using a layer 2 header: receiving, from the user equipment, a layer 3 measurement report comprising said measurement identifier; and causing the layer 1 measurement report configuration to be executed at the user equipment in response to receiving said measurement identifier.

Said receiving said layer 1 measurement reporting configuration may comprise receiving an instruction for the distributed unit to abstain from signalling the layer 1 measurement reporting configuration to the user equipment until an indication fulfilling at least one of the at least one activation conditions is received from the user equipment, and the method may further comprise: abstaining from signalling the received layer 1 measurement reporting configuration to the user equipment; receiving, from the user equipment, the indication fulfilling the at least one of the at least one activation conditions; and signalling the received layer 1 measurement reporting configuration to the user equipment in response to said receiving the indication fulfilling the at least one of the at least one activation conditions.

Receiving said layer 1 measurement reporting configuration may comprise receiving an instruction for the distributed unit to abstain from signalling the layer 1 measurement reporting configuration to the user equipment before a layer 3 measurement report fulfilling at least one of the at least one activation conditions is received from the user equipment, and the method may further comprise: signalling, the layer 1 and layer 3 measurement reporting configurations to the user equipment before receiving said indication fulfilling at least one of the at least one activation conditions.

Receiving said layer 1 measurement reporting configuration may comprise receiving an instruction for the distributed unit to trigger execution of the layer 1 measurement reporting configuration at the user equipment after receipt at the distributed unit of the indication fulfilling at least one of the at least one activation conditions is received from the user equipment, and the method may further comprise: in response to receiving the indication fulfilling at least one of the at least one activation conditions from the user equipment, signalling to the user equipment, a trigger for causing the user equipment to execute the layer 1 measurement reporting configuration.

Receiving said layer 1 measurement reporting configuration may comprise receiving an instruction for the user equipment to autonomously execute the layer 1 measurement reporting configuration when at least one of the at least one activation conditions is fulfilled, and the method may further comprise: providing, to the user equipment, the instruction for the user equipment to autonomously execute the layer 1 measurement reporting configuration when at least one of the at least one activation conditions is fulfilled; and subsequently receiving layer 1 measurement reports in accordance with the layer 1 measurement reporting configuration.

The method may further comprise, after receiving a layer 3 measurement report from the user equipment: signalling the layer 3 measurement report from the user equipment to the centralized unit; receiving, from the user equipment, at least one layer 1 measurement report in accordance with the received layer 1 measurement reporting configuration; determining, in dependence on the at least one layer 1 measurement report, that the user equipment is to be served by a target cell; and signalling, to the user equipment, an instruction to access the target cell.

The method may further comprise: receive, from the centralized unit, a new layer 1 measurement reporting configuration for said user equipment; signalling said new layer 1 measurement reporting configuration to the distributed unit to be executed by the user equipment as part of a lower layer mobility procedure; and receiving, from the user equipment, at least one layer 1 measurement report in accordance with the new layer 1 measurement reporting configuration, wherein said determining that the user equipment is to be served by the target cell is further performed in dependence on the at least one layer 1 measurement report received in accordance with the new layer 1 measurement reporting configuration. The method may further comprise: transmitting a respective layer 1 measurement reporting configuration to the centralized unit for use in generating said layer 1 measurement reporting configuration.

Said transmitting said respective layer 1 measurement reporting configurations may be performed when establishing respective interfaces between the distributed unit and the centralized unit.

The method may further comprise: signalling, to the user equipment, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a third aspect, there is provided a method for a user equipment, the method comprising: receiving, from a distributed unit of a radio access network, a layer 1 measurement reporting configuration and at least one activation condition for autonomous execution of the layer 1 reporting configuration; and causing said layer 1 measurement reporting configuration to be executed when at least one of the at least one activation condition is fulfilled.

The causing said layer 1 measurement reporting configuration to be executed when at least one of the at least one activation condition is fulfilled may comprise autonomously signalling said at least one layer 1 measurement report after at least one of the at least one activation conditions has been fulfilled.

Said causing said layer 1 measurement reporting configuration to be executed when at least one of the at least one activation condition is fulfilled may comprise: signalling, to the distributed unit, an indication that said at least one of the at least one activation conditions has been fulfilled; and receiving a trigger from the distributed unit that causes the user equipment to execute said layer 1 measurement reporting configuration.

The method may further comprise: receiving, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a fourth aspect, there is provided a method for a user equipment, the method comprising: receiving, from a distributed unit of a radio access network, a layer 3 measurement reporting configuration and at least one activation condition for indicating that a layer 1 reporting configuration is to be executed; determining that at least one of said at least one activation condition is fulfilled; and signalling a layer 3 measurement report with an indication that at least one of the at least one activation condition is fulfilled.

The method may further comprise: receiving, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a fifth aspect, there is provided an apparatus for a centralized unit of a radio access network, the apparatus comprising means for: signalling, to a distributed unit of the radio access network, a layer 1 measurement reporting configuration to be executed by a user equipment as part of a lower layer mobility procedure and at least one activation condition for autonomous execution of the layer 1 reporting configuration.

The apparatus may comprise means for signalling a layer 3 measurement reporting configuration to the distributed unit, the layer 3 measurement reporting configuring comprising an instruction for the user equipment to signal a measurement identifier for layer 3 measurement reports using a layer 2 header.

Said signalling the layer 1 measurement reporting configuration may comprise an instruction for the distributed unit to abstain from signalling the layer 1 measurement reporting configuration to the user equipment until an indication fulfilling at least one of the at least one activation conditions is received from the user equipment.

Said layer 1 measurement reporting configuration may comprise an instruction for the distributed unit to abstain from signalling the layer 1 measurement reporting configuration to the user equipment before an indication fulfilling at least one of the at least one activation conditions is received from the user equipment.

Said layer 1 measurement reporting configuration may comprise an instruction for the distributed unit to trigger execution of the layer 1 measurement reporting configuration at the user equipment after receipt at the distributed unit of the indication fulfilling at least one of the at least one activation conditions is received from the user equipment.

Said layer 1 measurement reporting configuration may comprise an instruction for the user equipment to autonomously execute the layer 1 measurement reporting configuration when at least one of the at least one activation conditions is fulfilled.

The apparatus may comprise means for, after receiving, from the user equipment, an indication that at least one of the at least one activation conditions has been fulfilled: determining that a mobility procedure is to be performed for said user equipment; obtaining respective configurations for a set of target cells for the user equipment; generating a new layer 1 measurement reporting configuration using said respective configurations; and signalling said new layer 1 measurement reporting configuration to the distributed unit to be executed by the user equipment as part of a lower layer mobility procedure.

The apparatus may comprise means for: receiving respective layer 1 measurement reporting configurations from a plurality of distributed units; and generating said layer 1 measurement reporting configuration using said received respective layer 1 measurement reporting configurations.

Said receiving respective layer 1 measurement reporting configurations may be performed when establishing respective interfaces between the distributed unit and the centralized unit.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a sixth aspect, there is provided an apparatus fora distributed unit of a radio access network, the apparatus comprising means for: receiving, from a centralized unit of the radio access network, a layer 1 measurement reporting configuration to be executed by a user equipment as part of a lower layer mobility procedure, and at least one activation condition for autonomous execution of the layer 1 reporting configuration.

The apparatus may comprise means for: receiving a layer 3 measurement reporting configuration comprising an instruction for the user equipment to signal a measurement identifier for layer 3 measurement reports using a layer 2 header: receiving, from the user equipment, a layer 3 measurement report comprising said measurement identifier; and causing the layer 1 measurement report configuration to be executed at the user equipment in response to receiving said measurement identifier.

Said means for receiving said layer 1 measurement reporting configuration may comprise means for receiving an instruction for the distributed unit to abstain from signalling the layer 1 measurement reporting configuration to the user equipment until an indication fulfilling at least one of the at least one activation conditions is received from the user equipment, and the apparatus may comprise means for: abstaining from signalling the received layer 1 measurement reporting configuration to the user equipment; receiving, from the user equipment, the indication fulfilling the at least one of the at least one activation conditions; and signalling the received layer 1 measurement reporting configuration to the user equipment in response to said receiving the indication fulfilling the at least one of the at least one activation conditions.

The means for receiving said layer 1 measurement reporting configuration may comprise means for receiving an instruction for the distributed unit to abstain from signalling the layer 1 measurement reporting configuration to the user equipment before a layer 3 measurement report fulfilling at least one of the at least one activation conditions is received from the user equipment, and the apparatus may comprise means for: signalling, the layer 1 and layer 3 measurement reporting configurations to the user equipment before receiving said indication fulfilling at least one of the at least one activation conditions.

The means for receiving said layer 1 measurement reporting configuration may comprise means for receiving an instruction for the distributed unit to trigger execution of the layer 1 measurement reporting configuration at the user equipment after receipt at the distributed unit of the indication fulfilling at least one of the at least one activation conditions is received from the user equipment, and the apparatus may comprise means for: in response to receiving the indication fulfilling at least one of the at least one activation conditions from the user equipment, signalling to the user equipment, a trigger for causing the user equipment to execute the layer 1 measurement reporting configuration.

The means for receiving said layer 1 measurement reporting configuration may comprise means for receiving an instruction for the user equipment to autonomously execute the layer 1 measurement reporting configuration when at least one of the at least one activation conditions is fulfilled, and the apparatus may comprise means for: providing, to the user equipment, the instruction for the user equipment to autonomously execute the layer 1 measurement reporting configuration when at least one of the at least one activation conditions is fulfilled; and subsequently receiving layer 1 measurement reports in accordance with the layer 1 measurement reporting configuration.

The apparatus may comprise means for, after receiving a layer 3 measurement report from the user equipment: signalling the layer 3 measurement report from the user equipment to the centralized unit; receiving, from the user equipment, at least one layer 1 measurement report in accordance with the received layer 1 measurement reporting configuration; determining, in dependence on the at least one layer 1 measurement report, that the user equipment is to be served by a target cell; and signalling, to the user equipment, an instruction to access the target cell.

The apparatus may comprise means for: receiving, from the centralized unit, a new layer 1 measurement reporting configuration for said user equipment; signalling said new layer 1 measurement reporting configuration to the distributed unit to be executed by the user equipment as part of a lower layer mobility procedure; and receiving, from the user equipment, at least one layer 1 measurement report in accordance with the new layer 1 measurement reporting configuration, wherein said determining that the user equipment is to be served by the target cell is further performed in dependence on the at least one layer 1 measurement report received in accordance with the new layer 1 measurement reporting configuration.

The apparatus may comprise means for: transmitting a respective layer 1 measurement reporting configuration to the centralized unit for use in generating said layer 1 measurement reporting configuration.

Said transmitting said respective layer 1 measurement reporting configurations may be performed when establishing respective interfaces between the distributed unit and the centralized unit.

The apparatus may comprise means for: signalling, to the user equipment, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a seventh aspect, there is provided an apparatus for a user equipment, the apparatus comprising means for: receiving, from a distributed unit of a radio access network, a layer 1 measurement reporting configuration and at least one activation condition for autonomous execution of the layer 1 reporting configuration; and causing said layer 1 measurement reporting configuration to be executed when at least one of the at least one activation condition is fulfilled.

The means for causing said layer 1 measurement reporting configuration to be executed when at least one of the at least one activation condition is fulfilled may comprise means for autonomously signalling said at least one layer 1 measurement report after at least one of the at least one activation conditions has been fulfilled.

Said means for causing said layer 1 measurement reporting configuration to be executed when at least one of the at least one activation condition is fulfilled may comprise means for: signalling, to the distributed unit, an indication that said at least one of the at least one activation conditions has been fulfilled; and receiving a trigger from the distributed unit that causes the user equipment to execute said layer 1 measurement reporting configuration.

The apparatus may comprise means for: receiving, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to an eighth aspect, there is provided an apparatus for a user equipment, the apparatus comprising means for: receiving, from a distributed unit of a radio access network, a layer 3 measurement reporting configuration and at least one activation condition for indicating that a layer 1 reporting configuration is to be executed; determining that at least one of said at least one activation condition is fulfilled; and signalling a layer 3 measurement report with an indication that at least one of the at least one activation condition is fulfilled.

The apparatus may comprise means for: receiving, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a ninth aspect, there is provided an apparatus for a centralized unit of a radio access network, the apparatus comprising: at least one processor; and at least one memory comprising code that, when executed by the at least one processor, causes the apparatus to: signal, to a distributed unit of the radio access network, a layer 1 measurement reporting configuration to be executed by a user equipment as part of a lower layer mobility procedure and at least one activation condition for autonomous execution of the layer 1 reporting configuration.

The apparatus may be caused to: signal a layer 3 measurement reporting configuration to the distributed unit, the layer 3 measurement reporting configuring comprising an instruction for the user equipment to signal a measurement identifier for layer 3 measurement reports using a layer 2 header.

Said signalling the layer 1 measurement reporting configuration may comprise an instruction for the distributed unit to abstain from signalling the layer 1 measurement reporting configuration to the user equipment until an indication fulfilling at least one of the at least one activation conditions is received from the user equipment.

Said layer 1 measurement reporting configuration may comprise an instruction for the distributed unit to abstain from signalling the layer 1 measurement reporting configuration to the user equipment before an indication fulfilling at least one of the at least one activation conditions is received from the user equipment.

Said layer 1 measurement reporting configuration may comprise an instruction for the distributed unit to trigger execution of the layer 1 measurement reporting configuration at the user equipment after receipt at the distributed unit of the indication fulfilling at least one of the at least one activation conditions is received from the user equipment.

Said layer 1 measurement reporting configuration may comprise an instruction for the user equipment to autonomously execute the layer 1 measurement reporting configuration when at least one of the at least one activation conditions is fulfilled.

The apparatus may be caused to, after receiving, from the user equipment, an indication that at least one of the at least one activation conditions has been fulfilled: determine that a mobility procedure is to be performed for said user equipment; obtaining respective configurations for a set of target cells for the user equipment; generating a new layer 1 measurement reporting configuration using said respective configurations; and signal said new layer 1 measurement reporting configuration to the distributed unit to be executed by the user equipment as part of a lower layer mobility procedure.

apparatus may be caused to: receive respective layer 1 measurement reporting configurations from a plurality of distributed units; and generate said layer 1 measurement reporting configuration using said received respective layer 1 measurement reporting configurations.

Said receiving respective layer 1 measurement reporting configurations may be performed when establishing respective interfaces between the distributed unit and the centralized unit.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a tenth aspect, there is provided an apparatus for a distributed unit of a radio access network, the apparatus comprising: at least one processor; and at least one memory comprising code that, when executed by the at least one processor, causes the apparatus to: receive, from a centralized unit of the radio access network, a layer 1 measurement reporting configuration to be executed by a user equipment as part of a lower layer mobility procedure, and at least one activation condition for autonomous execution of the layer 1 reporting configuration.

The apparatus may be caused to: receive a layer 3 measurement reporting configuration comprising an instruction for the user equipment to signal a measurement identifier for layer 3 measurement reports using a layer 2 header: receive, from the user equipment, a layer 3 measurement report comprising said measurement identifier; and cause the layer 1 measurement report configuration to be executed at the user equipment in response to receiving said measurement identifier.

Said receiving said layer 1 measurement reporting configuration may comprise receiving an instruction for the distributed unit to abstain from signalling the layer 1 measurement reporting configuration to the user equipment until an indication fulfilling at least one of the at least one activation conditions is received from the user equipment, and the apparatus may be caused to: abstain from signalling the received layer 1 measurement reporting configuration to the user equipment; receive, from the user equipment, the indication fulfilling the at least one of the at least one activation conditions; and signal the received layer 1 measurement reporting configuration to the user equipment in response to said receiving the indication fulfilling the at least one of the at least one activation conditions.

The receiving said layer 1 measurement reporting configuration may comprise receiving an instruction for the distributed unit to abstain from signalling the layer 1 measurement reporting configuration to the user equipment before a layer 3 measurement report fulfilling at least one of the at least one activation conditions is received from the user equipment, and the apparatus may be caused to: signal, the layer 1 and layer 3 measurement reporting configurations to the user equipment before receiving said indication fulfilling at least one of the at least one activation conditions.

The receiving said layer 1 measurement reporting configuration may comprise receiving an instruction for the distributed unit to trigger execution of the layer 1 measurement reporting configuration at the user equipment after receipt at the distributed unit of the indication fulfilling at least one of the at least one activation conditions is received from the user equipment, and the apparatus may be caused to: in response to receiving the indication fulfilling at least one of the at least one activation conditions from the user equipment, signal to the user equipment, a trigger for causing the user equipment to execute the layer 1 measurement reporting configuration.

The receiving said layer 1 measurement reporting configuration may comprise receiving an instruction for the user equipment to autonomously execute the layer 1 measurement reporting configuration when at least one of the at least one activation conditions is fulfilled, and the apparatus may be caused to: provide, to the user equipment, the instruction for the user equipment to autonomously execute the layer 1 measurement reporting configuration when at least one of the at least one activation conditions is fulfilled; and subsequently receive layer 1 measurement reports in accordance with the layer 1 measurement reporting configuration.

apparatus may be caused to, after receiving a layer 3 measurement report from the user equipment: signal the layer 3 measurement report from the user equipment to the centralized unit; receive, from the user equipment, at least one layer 1 measurement report in accordance with the received layer 1 measurement reporting configuration; determine, in dependence on the at least one layer 1 measurement report, that the user equipment is to be served by a target cell; and signal, to the user equipment, an instruction to access the target cell.

The apparatus may be caused to: receive, from the centralized unit, a new layer 1 measurement reporting configuration for said user equipment; signal said new layer 1 measurement reporting configuration to the distributed unit to be executed by the user equipment as part of a lower layer mobility procedure; and receive, from the user equipment, at least one layer 1 measurement report in accordance with the new layer 1 measurement reporting configuration, wherein said determining that the user equipment is to be served by the target cell is further performed in dependence on the at least one layer 1 measurement report received in accordance with the new layer 1 measurement reporting configuration.

The apparatus may be caused to: transmit a respective layer 1 measurement reporting configuration to the centralized unit for use in generating said layer 1 measurement reporting configuration.

Said transmitting said respective layer 1 measurement reporting configurations may be performed when establishing respective interfaces between the distributed unit and the centralized unit.

The apparatus may be caused to: signal, to the user equipment, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to an eleventh aspect, there is provided an apparatus for a user equipment, the apparatus comprising: at least one processor; and at least one memory comprising code that, when executed by the at least one processor, causes the apparatus to: receive, from a distributed unit of a radio access network, a layer 1 measurement reporting configuration and at least one activation condition for autonomous execution of the layer 1 reporting configuration; and cause said layer 1 measurement reporting configuration to be executed when at least one of the at least one activation condition is fulfilled.

The causing said layer 1 measurement reporting configuration to be executed when at least one of the at least one activation condition is fulfilled may comprise autonomously signalling said at least one layer 1 measurement report after at least one of the at least one activation conditions has been fulfilled.

Said causing said layer 1 measurement reporting configuration to be executed when at least one of the at least one activation condition is fulfilled may comprise: signalling, to the distributed unit, an indication that said at least one of the at least one activation conditions has been fulfilled; and receiving a trigger from the distributed unit that causes the user equipment to execute said layer 1 measurement reporting configuration.

The apparatus may be caused to: receive, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a twelfth aspect, there is provided an apparatus for a user equipment, the apparatus comprising: at least one processor; and at least one memory comprising code that, when executed by the at least one processor, causes the apparatus to: receive, from a distributed unit of a radio access network, a layer 3 measurement reporting configuration and at least one activation condition for indicating that a layer 1 reporting configuration is to be executed; determine that at least one of said at least one activation condition is fulfilled; and signal a layer 3 measurement report with an indication that at least one of the at least one activation condition is fulfilled.

The apparatus may be caused to: receive, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold;

a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a thirteenth aspect, there is provided an apparatus for a centralized unit of a radio access network, the apparatus comprising: signalling circuitry for signalling, to a distributed unit of the radio access network, a layer 1 measurement reporting configuration to be executed by a user equipment as part of a lower layer mobility procedure and at least one activation condition for autonomous execution of the layer 1 reporting configuration.

The apparatus may comprise signalling circuitry for signalling a layer 3 measurement reporting configuration to the distributed unit, the layer 3 measurement reporting configuring comprising an instruction for the user equipment to signal a measurement identifier for layer 3 measurement reports using a layer 2 header.

Said signalling the layer 1 measurement reporting configuration may comprise an instruction for the distributed unit to abstain from signalling the layer 1 measurement reporting configuration to the user equipment until an indication fulfilling at least one of the at least one activation conditions is received from the user equipment.

Said layer 1 measurement reporting configuration may comprise an instruction for the distributed unit to abstain from signalling the layer 1 measurement reporting configuration to the user equipment before an indication fulfilling at least one of the at least one activation conditions is received from the user equipment.

Said layer 1 measurement reporting configuration may comprise an instruction for the distributed unit to trigger execution of the layer 1 measurement reporting configuration at the user equipment after receipt at the distributed unit of the indication fulfilling at least one of the at least one activation conditions is received from the user equipment.

Said layer 1 measurement reporting configuration may comprise an instruction for the user equipment to autonomously execute the layer 1 measurement reporting configuration when at least one of the at least one activation conditions is fulfilled.

The apparatus may comprise, after receiving, from the user equipment, an indication that at least one of the at least one activation conditions has been fulfilled: determining circuitry for determining that a mobility procedure is to be performed for said user equipment; obtaining respective configurations for a set of target cells for the user equipment; generating circuitry for generating a new layer 1 measurement reporting configuration using said respective configurations; and signalling circuitry for signalling said new layer 1 measurement reporting configuration to the distributed unit to be executed by the user equipment as part of a lower layer mobility procedure.

The apparatus may comprise: receiving circuitry for receiving respective layer 1 measurement reporting configurations from a plurality of distributed units; and generating circuitry for generating said layer 1 measurement reporting configuration using said received respective layer 1 measurement reporting configurations.

Said receiving respective layer 1 measurement reporting configurations may be performed when establishing respective interfaces between the distributed unit and the centralized unit.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a fourteenth aspect, there is provided an apparatus for a distributed unit of a radio access network, the apparatus comprising: receiving circuitry for receiving, from a centralized unit of the radio access network, a layer 1 measurement reporting configuration to be executed by a user equipment as part of a lower layer mobility procedure, and at least one activation condition for autonomous execution of the layer 1 reporting configuration.

The apparatus may comprise: receiving circuitry for receiving a layer 3 measurement reporting configuration comprising an instruction for the user equipment to signal a measurement identifier for layer 3 measurement reports using a layer 2 header: receiving, from the user equipment, a layer 3 measurement report comprising said measurement identifier; and causing the layer 1 measurement report configuration to be executed at the user equipment in response to receiving said measurement identifier.

Said receiving circuitry for receiving said layer 1 measurement reporting configuration may comprise receiving circuitry for receiving an instruction for the distributed unit to abstain from signalling the layer 1 measurement reporting configuration to the user equipment until an indication fulfilling at least one of the at least one activation conditions is received from the user equipment, and the apparatus may comprise: abstaining circuitry for abstaining from signalling the received layer 1 measurement reporting configuration to the user equipment; receiving circuitry for receiving, from the user equipment, the indication fulfilling the at least one of the at least one activation conditions; and signalling circuitry for signalling the received layer 1 measurement reporting configuration to the user equipment in response to said receiving the indication fulfilling the at least one of the at least one activation conditions.

The receiving circuitry for receiving said layer 1 measurement reporting configuration may comprise receiving circuitry for receiving an instruction for the distributed unit to abstain from signalling the layer 1 measurement reporting configuration to the user equipment before a layer 3 measurement report fulfilling at least one of the at least one activation conditions is received from the user equipment, and the apparatus may comprise: signalling circuitry for signalling, the layer 1 and layer 3 measurement reporting configurations to the user equipment before receiving said indication fulfilling at least one of the at least one activation conditions.

The receiving circuitry for receiving said layer 1 measurement reporting configuration may comprise receiving circuitry for receiving an instruction for the distributed unit to trigger execution of the layer 1 measurement reporting configuration at the user equipment after receipt at the distributed unit of the indication fulfilling at least one of the at least one activation conditions is received from the user equipment, and the apparatus may comprise: in response to receiving the indication fulfilling at least one of the at least one activation conditions from the user equipment, signalling circuitry for signalling to the user equipment, a trigger for causing the user equipment to execute the layer 1 measurement reporting configuration.

The receiving circuitry for receiving said layer 1 measurement reporting configuration may comprise receiving circuitry for receiving an instruction for the user equipment to autonomously execute the layer 1 measurement reporting configuration when at least one of the at least one activation conditions is fulfilled, and the apparatus may comprise: providing circuitry for providing, to the user equipment, the instruction for the user equipment to autonomously execute the layer 1 measurement reporting configuration when at least one of the at least one activation conditions is fulfilled; and receiving circuitry for subsequently receiving layer 1 measurement reports in accordance with the layer 1 measurement reporting configuration.

The apparatus may comprise, after receiving a layer 3 measurement report from the user equipment: signalling circuitry for signalling the layer 3 measurement report from the user equipment to the centralized unit; receiving, from the user equipment, at least one layer 1 measurement report in accordance with the received layer 1 measurement reporting configuration; determining circuitry for determining, in dependence on the at least one layer 1 measurement report, that the user equipment is to be served by a target cell; and signalling circuitry for signalling, to the user equipment, an instruction to access the target cell.

The apparatus may comprise: receiving circuitry for receiving, from the centralized unit, a new layer 1 measurement reporting configuration for said user equipment; signalling circuitry for signalling said new layer 1 measurement reporting configuration to the distributed unit to be executed by the user equipment as part of a lower layer mobility procedure; and receiving circuitry for receiving, from the user equipment, at least one layer 1 measurement report in accordance with the new layer 1 measurement reporting configuration, wherein said determining that the user equipment is to be served by the target cell is further performed in dependence on the at least one layer 1 measurement report received in accordance with the new layer 1 measurement reporting configuration.

The apparatus may comprise: transmitting circuitry for transmitting a respective layer 1 measurement reporting configuration to the centralized unit for use in generating said layer 1 measurement reporting configuration.

Said transmitting said respective layer 1 measurement reporting configurations may be performed when establishing respective interfaces between the distributed unit and the centralized unit.

The apparatus may comprise: signalling circuitry for signalling, to the user equipment, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a fifteenth aspect, there is provided an apparatus for a user equipment, the apparatus comprising: receiving circuitry for receiving, from a distributed unit of a radio access network, a layer 1 measurement reporting configuration and at least one activation condition for autonomous execution of the layer 1 reporting configuration; and causing circuitry for causing said layer 1 measurement reporting configuration to be executed when at least one of the at least one activation condition is fulfilled.

The causing circuitry for causing said layer 1 measurement reporting configuration to be executed when at least one of the at least one activation condition is fulfilled may comprise signalling circuitry for autonomously signalling said at least one layer 1 measurement report after at least one of the at least one activation conditions has been fulfilled.

Said causing circuitry for causing said layer 1 measurement reporting configuration to be executed when at least one of the at least one activation condition is fulfilled may comprise: signalling circuitry for signalling, to the distributed unit, an indication that said at least one of the at least one activation conditions has been fulfilled; and receiving circuitry for receiving a trigger from the distributed unit that causes the user equipment to execute said layer 1 measurement reporting configuration.

The apparatus may comprise: receiving circuitry for receiving, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a sixteenth aspect, there is provided an apparatus for a user equipment, the apparatus comprising: receiving circuitry for receiving, from a distributed unit of a radio access network, a layer 3 measurement reporting configuration and at least one activation condition for indicating that a layer 1 reporting configuration is to be executed; determining circuitry for determining that at least one of said at least one activation condition is fulfilled; and signalling circuitry for signalling a layer 3 measurement report with an indication that at least one of the at least one activation condition is fulfilled.

The apparatus may comprise: receiving circuitry for receiving, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a seventeenth aspect, there is provided non-transitory computer readable medium comprising program instructions for causing an apparatus for a centralised unit of a radio access network to: signal, to a distributed unit of the radio access network, a layer 1 measurement reporting configuration to be executed by a user equipment as part of a lower layer mobility procedure and at least one activation condition for autonomous execution of the layer 1 reporting configuration.

The apparatus may be caused to: signal a layer 3 measurement reporting configuration to the distributed unit, the layer 3 measurement reporting configuring comprising an instruction for the user equipment to signal a measurement identifier for layer 3 measurement reports using a layer 2 header.

Said signalling the layer 1 measurement reporting configuration may comprise an instruction for the distributed unit to abstain from signalling the layer 1 measurement reporting configuration to the user equipment until an indication fulfilling at least one of the at least one activation conditions is received from the user equipment.

Said layer 1 measurement reporting configuration may comprise an instruction for the distributed unit to abstain from signalling the layer 1 measurement reporting configuration to the user equipment before an indication fulfilling at least one of the at least one activation conditions is received from the user equipment.

Said layer 1 measurement reporting configuration may comprise an instruction for the distributed unit to trigger execution of the layer 1 measurement reporting configuration at the user equipment after receipt at the distributed unit of the indication fulfilling at least one of the at least one activation conditions is received from the user equipment.

Said layer 1 measurement reporting configuration may comprise an instruction for the user equipment to autonomously execute the layer 1 measurement reporting configuration when at least one of the at least one activation conditions is fulfilled.

The apparatus may be caused to, after receiving, from the user equipment, an indication that at least one of the at least one activation conditions has been fulfilled: determine that a mobility procedure is to be performed for said user equipment; obtaining respective configurations for a set of target cells for the user equipment; generating a new layer 1 measurement reporting configuration using said respective configurations; and signal said new layer 1 measurement reporting configuration to the distributed unit to be executed by the user equipment as part of a lower layer mobility procedure.

apparatus may be caused to: receive respective layer 1 measurement reporting configurations from a plurality of distributed units; and generate said layer 1 measurement reporting configuration using said received respective layer 1 measurement reporting configurations.

Said receiving respective layer 1 measurement reporting configurations may be performed when establishing respective interfaces between the distributed unit and the centralized unit.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to an eighteenth aspect, there is provided non-transitory computer readable medium comprising program instructions for causing an apparatus for a distributed unit of a radio access network to: receive, from a centralized unit of the radio access network, a layer 1 measurement reporting configuration to be executed by a user equipment as part of a lower layer mobility procedure, and at least one activation condition for autonomous execution of the layer 1 reporting configuration.

The apparatus may be caused to: receive a layer 3 measurement reporting configuration comprising an instruction for the user equipment to signal a measurement identifier for layer 3 measurement reports using a layer 2 header: receive, from the user equipment, a layer 3 measurement report comprising said measurement identifier; and cause the layer 1 measurement report configuration to be executed at the user equipment in response to receiving said measurement identifier.

Said receiving said layer 1 measurement reporting configuration may comprise receiving an instruction for the distributed unit to abstain from signalling the layer 1 measurement reporting configuration to the user equipment until an indication fulfilling at least one of the at least one activation conditions is received from the user equipment, and the apparatus may be caused to: abstain from signalling the received layer 1 measurement reporting configuration to the user equipment; receive, from the user equipment, the indication fulfilling the at least one of the at least one activation conditions; and signal the received layer 1 measurement reporting configuration to the user equipment in response to said receiving the indication fulfilling the at least one of the at least one activation conditions.

The receiving said layer 1 measurement reporting configuration may comprise receiving an instruction for the distributed unit to abstain from signalling the layer 1 measurement reporting configuration to the user equipment before a layer 3 measurement report fulfilling at least one of the at least one activation conditions is received from the user equipment, and the apparatus may be caused to: signal, the layer 1 and layer 3 measurement reporting configurations to the user equipment before receiving said indication fulfilling at least one of the at least one activation conditions.

The receiving said layer 1 measurement reporting configuration may comprise receiving an instruction for the distributed unit to trigger execution of the layer 1 measurement reporting configuration at the user equipment after receipt at the distributed unit of the indication fulfilling at least one of the at least one activation conditions is received from the user equipment, and the apparatus may be caused to: in response to receiving the indication fulfilling at least one of the at least one activation conditions from the user equipment, signal to the user equipment, a trigger for causing the user equipment to execute the layer 1 measurement reporting configuration.

The receiving said layer 1 measurement reporting configuration may comprise receiving an instruction for the user equipment to autonomously execute the layer 1 measurement reporting configuration when at least one of the at least one activation conditions is fulfilled, and the apparatus may be caused to: provide, to the user equipment, the instruction for the user equipment to autonomously execute the layer 1 measurement reporting configuration when at least one of the at least one activation conditions is fulfilled; and subsequently receive layer 1 measurement reports in accordance with the layer 1 measurement reporting configuration.

apparatus may be caused to, after receiving a layer 3 measurement report from the user equipment: signal the layer 3 measurement report from the user equipment to the centralized unit; receive, from the user equipment, at least one layer 1 measurement report in accordance with the received layer 1 measurement reporting configuration; determine, in dependence on the at least one layer 1 measurement report, that the user equipment is to be served by a target cell; and signal, to the user equipment, an instruction to access the target cell.

The apparatus may be caused to: receive, from the centralized unit, a new layer 1 measurement reporting configuration for said user equipment; signal said new layer 1 measurement reporting configuration to the distributed unit to be executed by the user equipment as part of a lower layer mobility procedure; and receive, from the user equipment, at least one layer 1 measurement report in accordance with the new layer 1 measurement reporting configuration, wherein said determining that the user equipment is to be served by the target cell is further performed in dependence on the at least one layer 1 measurement report received in accordance with the new layer 1 measurement reporting configuration.

The apparatus may be caused to: transmit a respective layer 1 measurement reporting configuration to the centralized unit for use in generating said layer 1 measurement reporting configuration.

Said transmitting said respective layer 1 measurement reporting configurations may be performed when establishing respective interfaces between the distributed unit and the centralized unit.

The apparatus may be caused to: signal, to the user equipment, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a nineteenth aspect, there is provided non-transitory computer readable medium comprising program instructions for causing an apparatus fora user equipment to: receive, from a distributed unit of a radio access network, a layer 1 measurement reporting configuration and at least one activation condition for autonomous execution of the layer 1 reporting configuration; and cause said layer 1 measurement reporting configuration to be executed when at least one of the at least one activation condition is fulfilled.

The causing said layer 1 measurement reporting configuration to be executed when at least one of the at least one activation condition is fulfilled may comprise autonomously signalling said at least one layer 1 measurement report after at least one of the at least one activation conditions has been fulfilled.

Said causing said layer 1 measurement reporting configuration to be executed when at least one of the at least one activation condition is fulfilled may comprise: signalling, to the distributed unit, an indication that said at least one of the at least one activation conditions has been fulfilled; and receiving a trigger from the distributed unit that causes the user equipment to execute said layer 1 measurement reporting configuration.

The apparatus may be caused to: receive, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a twentieth aspect, there is provided non-transitory computer readable medium comprising program instructions for causing an apparatus fora user equipment to: receive, from a distributed unit of a radio access network, a layer 3 measurement reporting configuration and at least one activation condition for indicating that a layer 1 reporting configuration is to be executed; determine that at least one of said at least one activation condition is fulfilled; and signal a layer 3 measurement report with an indication that at least one of the at least one activation condition is fulfilled.

The apparatus may be caused to: receive, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

Layer 3 and layer 1 measurement reporting configurations may be comprised in a same message.

The at least one activation condition may comprise at least one of: a property of the serving cell is determined to become better than a first threshold; a property of the serving cell is determined to become worse than a second threshold; a neighbor cell is determined to become offset better than serving cell; a neighbor cell is determined to become better than an offset; a property of the serving cell is determined to become worse than a third threshold and said property of a neighbor cell is determined to become better than a fourth threshold; a property of a neighbor cell is determined to become better than a fifth threshold; a property of an inter-Radio Access Technology (RAT) neighbor is determined to become better than a sixth threshold; a property of a Primary Cell (PCell) is determined to become worse than a seventh threshold, and said property of an inter RAT neighbor is determined to become better than an eighth threshold; a measured interference is determined to become higher than a ninth threshold; coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

According to a twenty first aspect, there is provided a computer program product stored on a medium that may cause an apparatus to perform any method as described herein.

According to a twenty second aspect, there is provided an electronic device that may comprise apparatus as described herein.

According to a twenty third aspect, there is provided a chipset that may comprise an apparatus as described herein.

BRIEF DESCRIPTION OF FIGURES

Some examples, will now be described, merely by way of illustration only, with reference to the accompanying drawings in which.

DETAILED DESCRIPTION

Before describing in detail the examples, certain general principles of a 5G wireless communication system are briefly explained with reference to FIGS. 1A and 1B.

Figure 1A:
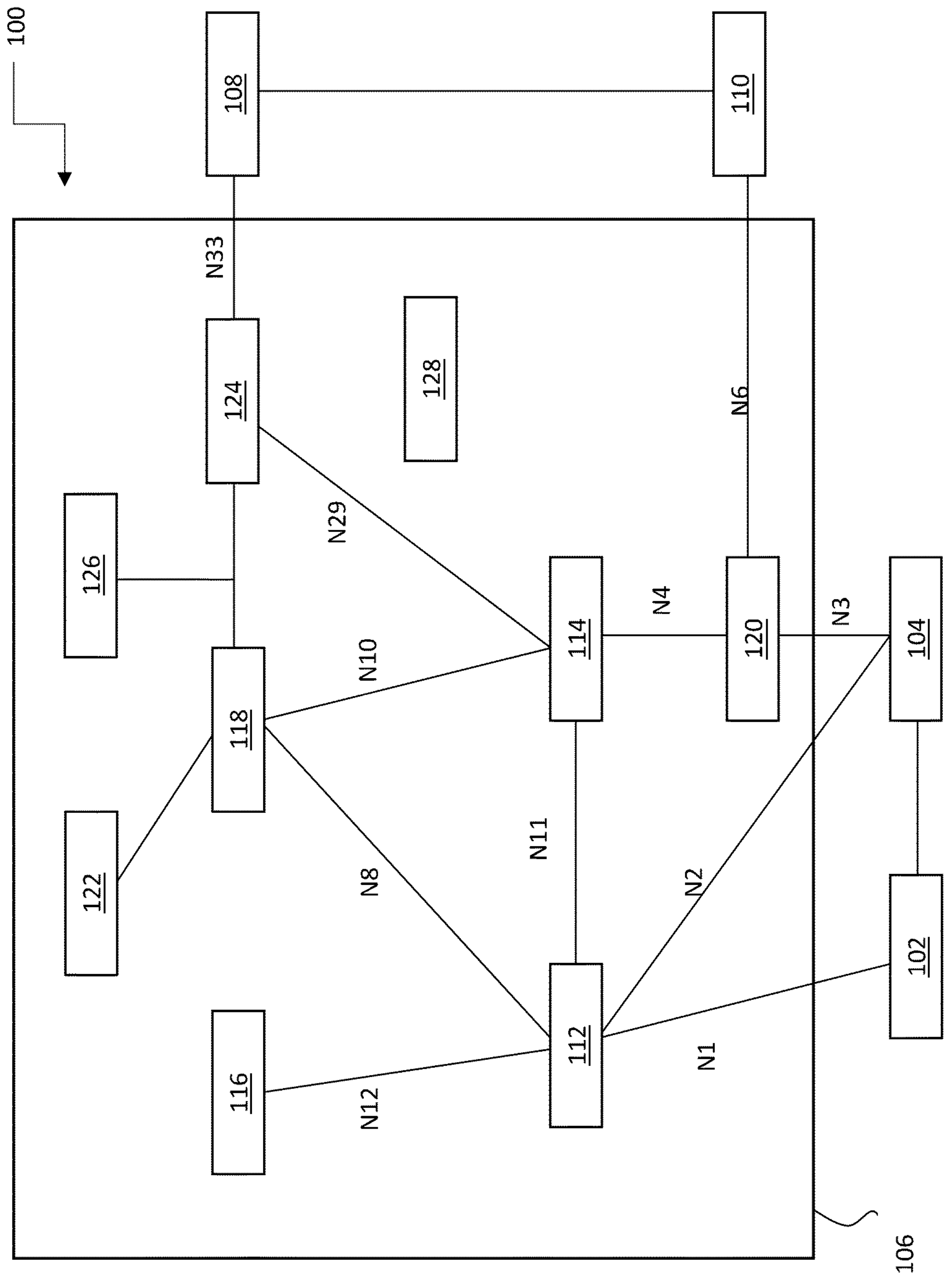
FIGS. 1A and 1B show a schematic representation of a 5G system.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer fora network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

Figure 1B:
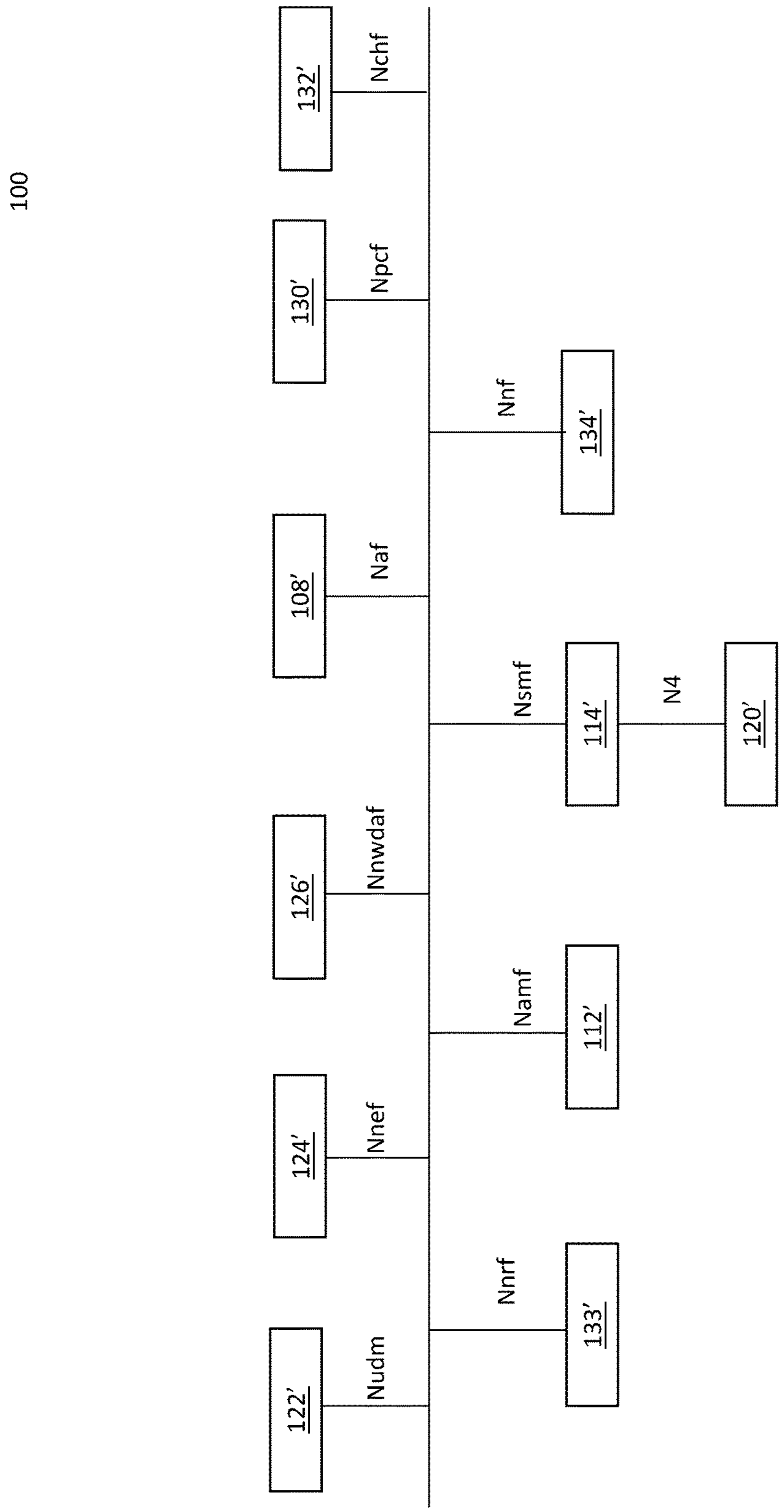

FIG. 1B shows a schematic representation of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other. The 5G core 106' further comprises a network repository function (NRF) 133' and a network function 134' that connect to the interconnect medium.

3GPP has issued a number of releases (Rel) for defining operating communication protocols related to a communications network. Currently, objectives and work are being set in relation to Release 18 (Rel. 18).

L1/L2 Triggered Mobility (LTM) is one of the objectives for mobility enhancement in Rel. 18. LTM generally relates to mobility procedures that are governed by the Media Access Control (MAC) layer and/or Physical layer (i.e., to mobility procedures that are governed by layer 2 (L2) and/or layer 1 (L1)). In contrast to layer 3 (L3) mobility procedures where the handover between two cells is decided by a Radio Resource Control (RRC) layer, LTM decisions may be made by the MAC layer terminated in a Distributed Unit (DU). A DU provides support for lower layers of a protocol stack (e.g., L1, and L2) for enabling a UE to access a network. In contrast, a centralized unit (CU) provides support for higher layers of a protocol stack (e.g., L3 and above) for enabling a UE to access a network.

Figure 6:
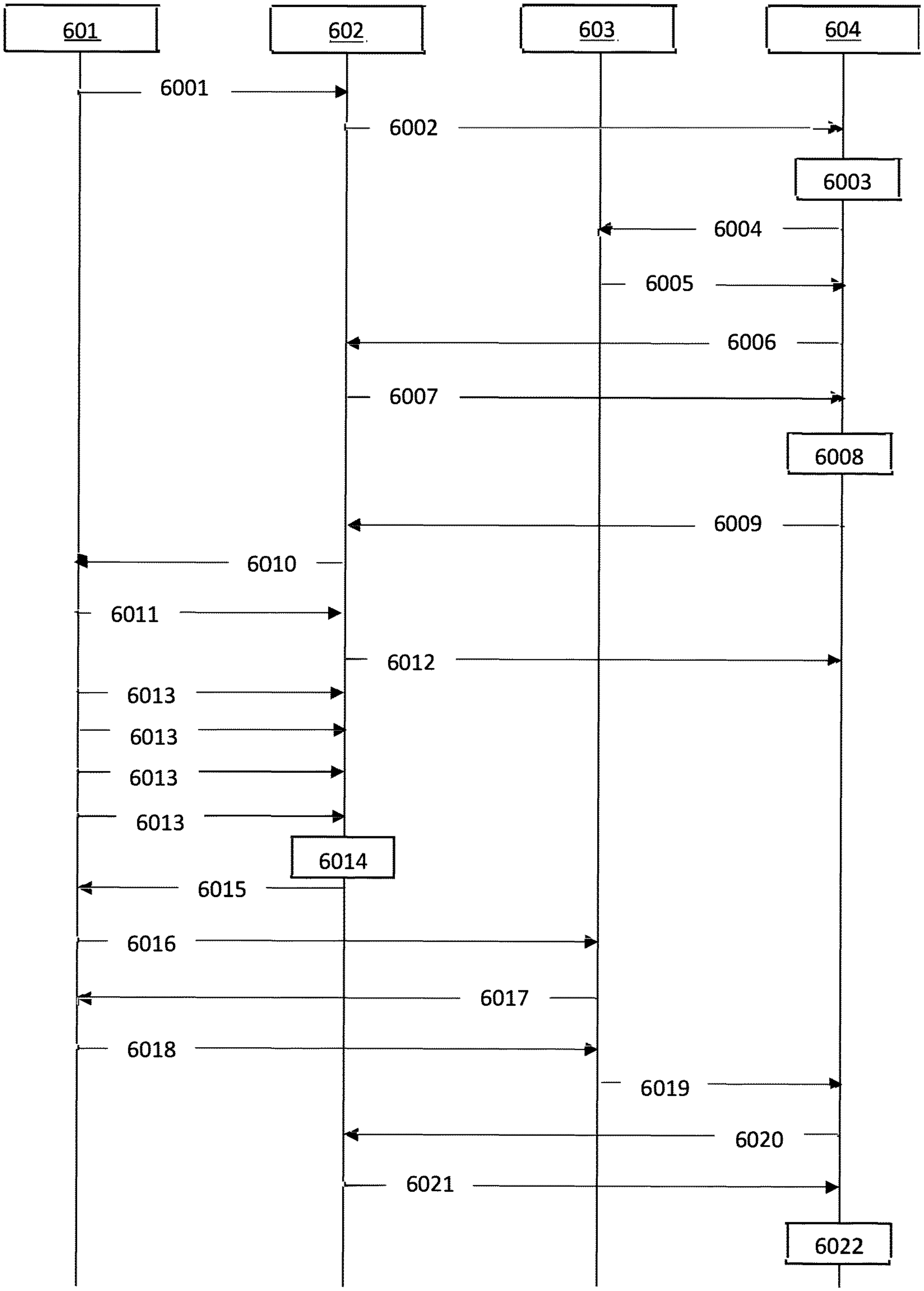
FIG. 6 illustrates signalling.

An LTM procedure is illustrated with respect to FIG. 6 for the signalling diagram of an LTM from a serving cell in a source DU to a target cell in a target DU (the so-called inter-DU intra-CU scenario). The same procedures illustrated in FIG. 6 would also apply to the case of intra-DU intra-CU cell change procedures, where the source DU would be the same as a target DU.

The procedure illustrated in FIG. 6 is split in three phases, namely Preparation, Execution, and Completion. Each phase is described in more detail below in relation to FIG. 6.

FIG. 6 illustrates signalling that may be performed between a UE 601, a source DU 602, a target DU 603, and a Centralised Unit (CU) 604.

6001 to 6012 relate to a Preparation phase of the LTM procedure.

During 6001, the UE 601 signals the source DU 602. This signalling comprises a measurement report. The measurement report may comprise measurements relating to a source and/or target cells of the UE 601. This measurement report may be an L3 measurement report in that it's formatted to be understood at an RRC layer.

During 6002, the source DU 602 signals the CU 604. This signalling may comprise the L3 measurement report received during 6001. This signalling may comprise an uplink (UL) RRC message transfer service operation.

During 6003, the CU 604 makes a target cell preparation decision. For example, the CU 604 may use the reported measurements of 6002 to identify a set of candidate target cells to which the UE may be handed over to. In the present example, the CU 604 identifies candidate target cells that are served by either source DU 602 or target DU 603, which are both controlled by CU 604.

During 6004, the CU 604 signals the target DU 603. This signalling may request that the target DU 603 prepares at least one candidate target cell for access by the UE 601. This signalling may comprise a UE context setup request service operation.

During 6005, the target DU 603 responds to the signalling of 6004. This response may comprise a configuration to be applied by the UE for accessing a candidate cell prepared by the target DU 603 in response to the signalling of 6004. It is understood that the target DU 603 may provide multiple configurations to be applied by the UE for accessing respective candidate cells prepared by the target DU 603 in response to the signalling of 6004. The configuration may comprise UE-specific parts and non-UE-specific parts. The signalling of 6005 may comprise a UE context setup response service operation.

During 6006, the CU 604 signals the source DU 602. This signalling may comprise a request for the source DU to prepare at least one candidate target cell controlled by the source DU 602 for the UE. This signalling may comprise a UE context modification request service operation.

During 6007, the source DU 602 responds to the signalling of 6006. This response may comprise a configuration to be applied by the UE for accessing a candidate cell prepared by the source DU 602 in response to the signalling of 6006. It is understood that the source DU 602 may provide multiple configurations to be applied by the UE for accessing respective candidate cells prepared by the source DU 602 in response to the signalling of 6006. The configuration may comprise UE-specific parts and non-UE-specific parts. The signalling of 6007 may comprise a UE context modification response service operation.

During 6008, after having received the UE configurations during 6005 and 6007, the CU 604 generates an RRC Reconfiguration to be applied by the UE. This RRC Reconfiguration may comprise a measurement reporting configuration for LTM (e.g., a configuration for causing the UE to report L1 beam measurements of serving and target cells), and respective configurations of the prepared candidate cell(s) for execution by the UE when the UE receives a layer 2 (L2) command to change the serving cell (e.g., perform handover).

Thus, during 6008, the network may generate instructions for configuring a UE (in RRC CONNECTED mode) to perform L1 measurements. The network may configure the UE to report them or use them to evaluate a condition associated with conditional reconfiguration for prepared target cells. The measurement configuration may be provided using dedicated signalling. For example, the measurement configuration may be provide using the RRCReconfiguration and/or RRCResume service operations.

The network may configure the UE to perform different type of measurements. For example, the network may configure the UE to perform at least one of: New Radio measurements, inter-Radio Access Technology (RAT) measurements of Enhanced-Universal Terrestrial Radio Access (E-UTRA) or UTRA-Frequency Division Duplex (FDD) frequencies, etc.

The network may configure the UE to report different types of Channel State Indicator-Reference Signal (CSI-RS) resources based measurements, e.g., measurement results per CSI-RS resource, per cell based on CSI-RS resource(s), and/or CSI-RS resource measurement identifiers.

The Measurement configuration may comprise at least one (and possible all) of the following parameters:

- Measurement objects: A list of objects (measurement frequency) on which the UE is to perform the measurements.
- Reporting configurations: A list of reporting configurations where there can be one or multiple reporting configurations per measurement object. Each measurement reporting configuration may comprise reporting criterion (periodic or event triggered), reference signal (RS) type (SS/PBCH block or CSI-RS), and reporting format. In case of conditional reconfiguration, i.e., Conditional Handover (CHO), Conditional Primary-Secondary Addition and/or change (CPAC). The reporting configurations may comprise execution criteria and/or reference signal (RS) type.
- Measurement identities: For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. For conditional reconfiguration triggering, measurement identity is associated to one conditional reconfiguration trigger configuration. Up to two measurement identities may be linked to one conditional reconfiguration execution condition.
- Quantity configurations: The quantity configuration defines the measurement filtering configuration used for all event evaluation and related reporting, and for periodical reporting of that measurement.
- Measurement gaps: Time periods that the UE may use to perform measurements.

During 6009, the CU 604 signals the source DU 602. This signalling may comprise the RRC Reconfiguration generated during 6008. This signalling may be comprised in a downlink RRC message transfer service operation, although it is understood that this is not the only service operation that may be used.

During 6010, the source DU 602 signals the UE 601. This signalling may comprise the RRC Reconfiguration received by the source DU 602 during 6009.

During 6011, the UE confirms receipt of the signalling of 6010. This may be performed after the UE 601 has performed at least part of the RRC Reconfiguration received during 6010.

During 6012, the source DU 602 signals the CU 604 to inform the CU 604 that the RRC Reconfiguration has been acknowledged by the UE 601. This signalling of 6012 may be provided using an uplink RRC message transfer service operation.

6013 to 6019 relate to an execution phase.

During 6013, the UE 601 signals a plurality of L1 beam measurement reports in respect of measurements to the source DU 602. It is understood that although 6013 is illustrated as after the signalling 6011, the UE 601 does not necessarily wait for RRC Reconfiguration complete message of 6011 to be sent before initiating the L1 measurement reporting of 6013. In other words, the UE 601 may initiate the signalling of 6013 upon applying the RRC reconfiguration received during 6010.

During 6014, the source DU 602 determines, based on the measurements comprised in the measurement reports of 6013, that the UE would be better served by a target candidate cell (target DU 603 in the present example). For example, during 6014, the source DU 602 may determine that target DU 603 has a better radio link/beam measurements for the UE 601 than what is currently being provided by the source SN 602 (e.g., L1-Reference-Signal-Received Power (RSRP) of target beam measurement>L1-RSRP of serving beam measurement and an Offset for a time period (i.e. Time-to-Trigger (TTT) period).

During 6015, the source DU 602 signals the UE 601. This signalling may comprise a trigger for causing the UE to perform a cell change operation to stop being served by the source DU 602 and instead be served by the target DU 603. This signalling may be performed in response to the determination of 6014. This signalling may be comprised in a MAC Control Element (MAC CE).

During 6016, following receipt of the trigger of 6015, the UE 601 initiates a random access procedure with the target DU 603 for being served by the DU 603.

During 6017, the target DU 603 provides a random access response to the UE 601 in response to the signalling of 6016.

During 6018, the UE 601 signals the target DU 603. This signalling may comprise an indication that an RRC Reconfiguration operation has been performed such that the UE 601 is now being served by the target DU 603. This signalling may be comprised in an RRC Reconfiguration complete service operation.

During 6019, the target DU 603 forwards the received indication of 6018 to the CU 604. This signalling may be comprised in an uplink RRC message transfer service operation.

6020 to 6022 relate to a Completion phase.

During 6020, the CU 604 signals the source DU 602 to instruct the source DU to release UE context that the source DU has stored in respect of the UE 601. This signalling may be comprised in a UE context release command service operation.

During 6021, the source DU 602 signals the CU 604. This signalling comprises an indication that the source DU 602 has released UE context for the UE 601. This signalling may be comprised in a UE context release complete service operation.

During 6022, a path switch is performed to the new serving DU (i.e., to target DU 603) such communications for the UE 601 are routed to the target DU 603 instead of to the source DU 602.

In mobile networks, a UE aims to connect to the network through a cell that provides good link quality, i.e., a good link provides the UE with signals having a signal-to-interference-noise-ratio (SINR) above a predetermined threshold. When the UE moves away from a gNB's cell currently serving the UE and gets closer to another neighbour cell (or target cell), the received signal power of the serving cell degrades as interference from the target cell becomes dominant. Eventually, the UE handovers to the target cell to sustain the connection to the network, as illustrated in FIG. 6.

In more detail, as part of the signal/link measurements made by the UE, a Reference Signal Received Power (RSRP) of the serving cell is compared against that of target cell to determine whether to handover the connection of the UE from the serving cell to the target cell. Those received signal power measurements fluctuate a lot due to channel/hardware impairments, e.g., thermal noise, fast-fading, measurement error, and shadow fading. Using those UE measurements without any filtering can lead to suboptimal (inefficient) cell change decisions resulting from rapid fluctuations and uncertainties of the measured signals. To mitigate those impairments and uncertainty (i.e., to prevent erroneous decisions), those raw measurements may be filtered by a moving average filter (L1 filter) and/or a recursive filter (L3 filter) that help to provide more accurate measurements at the expense of the additional delay in obtaining the measurements resulting from filtering the measurements.

UE-based measurements are fundamental part of the mobility in mobile networks. As inaccurate cell quality measurements may lead to faulty handover decisions in the network and cause UEs to experience service interruption (e.g., Radio Link Failure (RLF), Handover Failure (HOF) or Ping-Pong (PP)), it is important for the UE to perform accurate cell quality measurements and hence, achieve good mobility performance.

3GPP TS 38.300 defines the measurement model for UEs in RRC CONNECTED mode. Herein, the UE measures multiple beams (at least one) of a cell and the measurements results (power values) are averaged to derive a value representing a cell quality of the cell being measured. In doing so, the UE is configured to consider a subset of the detected beams. Filtering takes place at two different levels: at the physical layer to derive beam quality and then at RRC level to derive cell quality from multiple beams. Cell quality from beam measurements is derived through the same way for both serving cell(s) and non-serving cell(s). This is illustrated with respect to FIG. 7.

Figure 7:
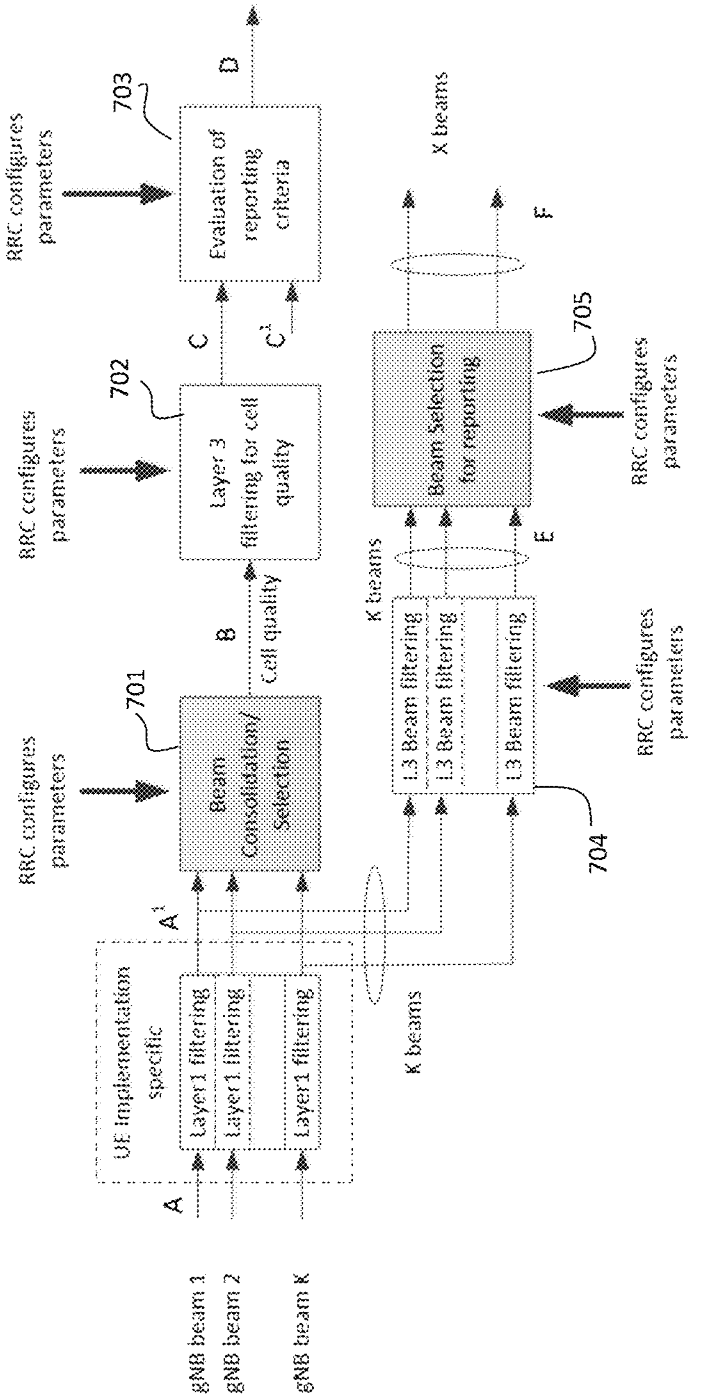
FIG. 7 illustrates example architecture.

FIG. 7 illustrates a UE that receives a plurality of beam-specific measurement samples (A) for k gNB beams, which it then filters using UE implementation-specific layer 1 filtering. These are output as $A^1$ measurements to two different paths.

The first path provides the $A^1$ measurements to a first function 701 that outputs a cell quality at point B. This cell quality is filtered using layer 3 filtering for cell quality at second function 702 to output C. Output C is provided to a third function 703 (which also receives an input $C^1$).

The second path provides the $A^1$ measurements a fourth function 704 that performs L3 filter to output k filtered beams at E to a fifth function 705.

- A: measurements (beam specific samples) internal to the physical layer.
- $A^1$: measurements (i.e. beam specific measurements) reported by layer 1 to layer 3 after layer 1 filtering.
- Layer 1 filtering: internal layer 1 filtering of the inputs measured at point A. Exact filtering is implementation dependent. How the measurements are actually performed in the physical layer by an implementation (inputs A and Layer 1 filtering) is not constrained by the standard.
- Layer 3 filtering for cell quality at the second function 702: filtering performed on the measurements provided at point B. The behaviour of the Layer 3 filter is standardized and the configuration of the layer 3 filter is provided by RRC signalling. Filtering reporting period at C equals one measurement period at B.

Layer 1 filtering introduces a certain level of measurement averaging to both $A^1$ and E relative to their inputs. How and when the UE exactly performs the required measurements is implementation specific to the point that the output at B fulfills the performance requirements set in TS 38.133. L1 Synchronization Signal Block-Reference Signal Received Power (SSB-RSRP) intra-frequency measurement requirements are shown in Table-1 and Table-2 below (defined in TS 38.133), where the first one is for absolute accuracy and the second one is for relative accuracy. The normal and extreme conditions are defined in TS 38.581 which are defined for different measurement environment conditions, i.e., temperature, voltage, humidity, etc.

The L3 filter is a recursive filter that is defined in TS 38.331 section 5.5.3.2 and expressed as $$F_n=(1-a)\times F_{n-1}+a\times M_n.$$

Herein, $F_n$ is current L3 filter output (C in FIG. 7), $F_{n-1}$ is previous L3 filter output and $M_n$ is current L3 filter input (B in FIG. 1). a is the forgetting factor of recursive filter defined as $$a=\frac{1}{2^{\frac{k}{4}}}$$

and k is the filterCoefficient that is configured by the network to determine time characteristics of the L3 filter, i.e., in X ms, the input of the L3 filter $M_n$ is be reduced by factor of (1−a).

TABLE 1

Synchronization Signal-Reference Signal Received Power (SS-RSRP) Intra frequency absolute accuracy in Frequency Range 2 (FR2) (Table 10.1.3.1.1-1 from TS 38.133)

| Accuracy | | Conditions | | | | |
|---|---|---|---|---|---|---|
| | | | Io [Note 2] range | | | |
| | | | Minimum Io | | | |
| Normal | Extreme | SSB | dBm/SCS$_{SSB}$ [Note 1] | | | |
| condition dB | condition dB | Ês/Iot dB | SCS$_{SSB}$ = 120 kHz | SCS$_{SSB}$ = 240 kHz | dBm/BW$_{Channel}$ | Maximum Io dBm/BW$_{Channel}$ |
| ±6 | ±9 | ≥−6 | Same value as SSB_RP in Table B.2.2-2, according to UE Power class, operating band and angle of arrival | | N/A | −70 |
| ±8 | ±11 | | N/A | | −70 | −50 |

Note 1:

Values based on Reference Sensibility (Refsens) and Effective Isotopic Sensitivity (EIS) spherical coverage as defined in clauses 7.3.2 and 7.3.4 of TS 38.101-2. Applicable side condition selected depending on angle of arrival.

Note 2:

Io specified at the Reference point, and assumed to have constant Energy per Resource Element (EPRE) across the bandwidth.

Note 3:

In the test cases, the SSB Ês/Iot and related parameters may need to be adjusted to ensure Ês/Iot at UE baseband is above the value defined in this table.

TABLE 2

SS-RSRP Intra frequency relative accuracy in FR2 (Table 10.1.3.1.2-1 from 38.133)

| Accuracy | | Conditions | | | |
|---|---|---|---|---|---|
| | | | Io [Note 2] range | | |
| | | | Minimum Io | | |
| Normal | Extreme | SSB | dBm/SCS$_{SSB}$ [Note 1] | | |
| condition dB | condition dB | Ês/Iot dB | SCS$_{SSB}$ = 120 KHz | SCS$_{SSB}$ = 240 KHz | Maximum Io dBm/BW$_{Channel}$ |
| ±6 | ±9 | ≥−6 | Same value as SSB_RP in Table B.2.2-2, according to UE Power class, operating band and angle of arrival | | −50 |

Note 1:

Values based on Refsens and EIS spherical coverage as defined in clauses 7.3.2 and 7.3.4 of TS 38.101-2. Applicable side condition selected depending on angle of arrival.

Note 2:

Io specified at the Reference point, and assumed to have constant EPRE across the bandwidth.

Note 3:

In the test cases, the SSB Ês/Iot and related parameters may need to be adjusted to ensure Ês/Iot at UE baseband is above the value defined in this table.

Note 4:

The parameter SSB Ês/Iot is the minimum SSB Ês/Iot of the pair of cells to which the requirement applies.

In these Tables, Io may be considered to represent a total received power density, including signal and interference, as measured at the UE antenna connector.

Further, Ês and Iot may be as defined in TS 38.133.

For example, Ês may be considered to represent a received energy per resource element (power normalized to the subcarrier spacing) during a useful part of the symbol (i.e. excluding the cyclic prefix) at the UE antenna connector or at the gNB reference point as defined in TS 38.215, subclause 5.2 for the respective measurement type.

Further, Iot may be considered to represent a received power spectral density of the total noise and interference for a certain resource element (power integrated over the resource element and normalized to the subcarrier spacing) as measured at the UE antenna connector or at the gNB reference point as defined in TS 38.215, subclause 5.2 for at least one of the respective measurement type:

The power spectral density of a white noise source (average power per RE normalised to the subcarrier spacing), simulating interference from cells that are not defined in a test procedure, as measured at the UE antenna connector Physical Resource Block number as defined in clause 3.2 in TS 38.211.

Timing offset between uplink and downlink radio frames at the UE, as defined in clause 4.2 in TS 38.213.

Fixed timing advance offset, as defined in clause 7.1.2.2 in TS 38.133.

Configured UE transmitted power as defined in clause 6.2.4 in TS 38.101-1, 38-101-2 and 38.101-3.

As illustrated in FIG. 6, the network currently relies on L1 measurements to trigger LTM procedures. As illustrated in FIG. 6, the source DU 602/serving cell decides on the LTM (i.e., cell change) during 6014 after receiving one or more L1 measurement reports from the UE 601 in 6013.

However, the present application recognizes that it is not always feasible to rely solely on L1 measurements when deciding on the LTM as the L1 measurements are not accurate enough. In particular, considering the minimum accuracy requirements in Table 1 and Table 2, the L1 measurements are still subject to fluctuations as the required accuracy margin is 12 dB (±6 dB). Although the L3 filtered measurements mitigate those impairments, the L3 filter is operated at the UE side and does not send those measurements to the network. Additionally, running L3 filters introduces further delay.

In LTM, it is expected that network may apply filtering at lower levels. For example, the network may operate an L2 filter on the L1 measurements to mitigate against the effects of those impairments.

There is also considered an L3 filter. In the present context, the L3 filter refers to a specific filter that is defined in TS 38.300 and TS 38.331. This L3 filter cannot be or made adaptive as it runs at the UE side. A network can adopt this filter and modify it, e.g., to make adaptive in order to filter reported L1 measurements. However, this filter cannot be called a L3 filter anymore as it does not operate within the definition provided.

The major difference between L2 and L3 filter is that the network is able to apply an adaptive L2 filter for running any complex filtering algorithm.

The present application further recognizes that L1 measurements may desirably be observed for at least a predetermined period of time in order to produce a meaningful and accurate L3 or L2 filter output that can be used to decide on the mobility. (irrespective of the L2 filter design).

In LTM, the network can start to receive the L1 measurements only after the preparation of the target cells is complete (which is after the L3 measurement report has been considered by a CU). This is because, the L1 measurement reporting configuration of the UE is configured in the RRC Reconfiguration message that is sent to the UE along with the target cell preparation (e.g., during 6010 in FIG. 6).

In fact, the L1 measurements that are used by the serving/source DU 602 for LTM procedures are delayed by the time required for LTM preparation phase (between L3 measurement report in 6001 and RRC Reconfiguration in 6010). This may jeopardize the mobility of the UE, particularly in Frequency Range 2 (FR2 scenarios) when the serving/source cell received signal power decreases rapidly and/or the neighbor cell received signal power increases rapidly at the UE. As a result of this rapidly changing link conditions, the quality of the link between the UE and the serving cell decreases dramatically due to decreasing signal-to-interference and noise ratio (SINR). In such situations, even if the RRC Reconfiguration is delivered to the UE, the MAC CE command may not be delivered to the UE since the network needs to monitor L1 measurements for certain period of time to observe that the radio conditions are adequate to trigger the handover (e.g., to trigger MAC CE transmission for LTM).

There is therefore a problem in that, in LTM, the UE can report L1 measurement only after the LTM preparation is completed, which delays the whole LTM execution procedure and jeopardize the robustness of the UE connectivity.

Although it is possible to configure the UE to report the L3 measurement earlier so that the preparation is performed earlier (which is referred to as "preponing"), preponing the L3 measurement report leads the following problems.

First, the target cell resources are reserved for a longer period of time due to early preparation, which is an inefficient use of resources, especially with large numbers of UE in a cell.

Second, such preponing may lead to false alarms being raised when the handover may not be performed at all since the preparation decision is taken too early (before making sure that the target cell is really a good cell for the UE to be served by). This leads to several related issues, such as, for example, unnecessary target cell resource reservations, serving cell uplink control channel resources being wasted due to reporting L1 measurements that are to used, and unnecessary UE power consumption due to unnecessary L1 measurement reporting.

To address at least one of the above-mentioned issues, the following proposes mechanisms for enabling a UE to start reporting L1 measurements early enough so that the LTM decision is not delayed without jeopardizing UE mobility robustness. In addition, the following proposed mechanisms aim to avoiding introducing unnecessary target resource reservation and UE power consumption.

These mechanisms will be illustrated with the following examples of FIGS. 8 to 14.

Figure 8:
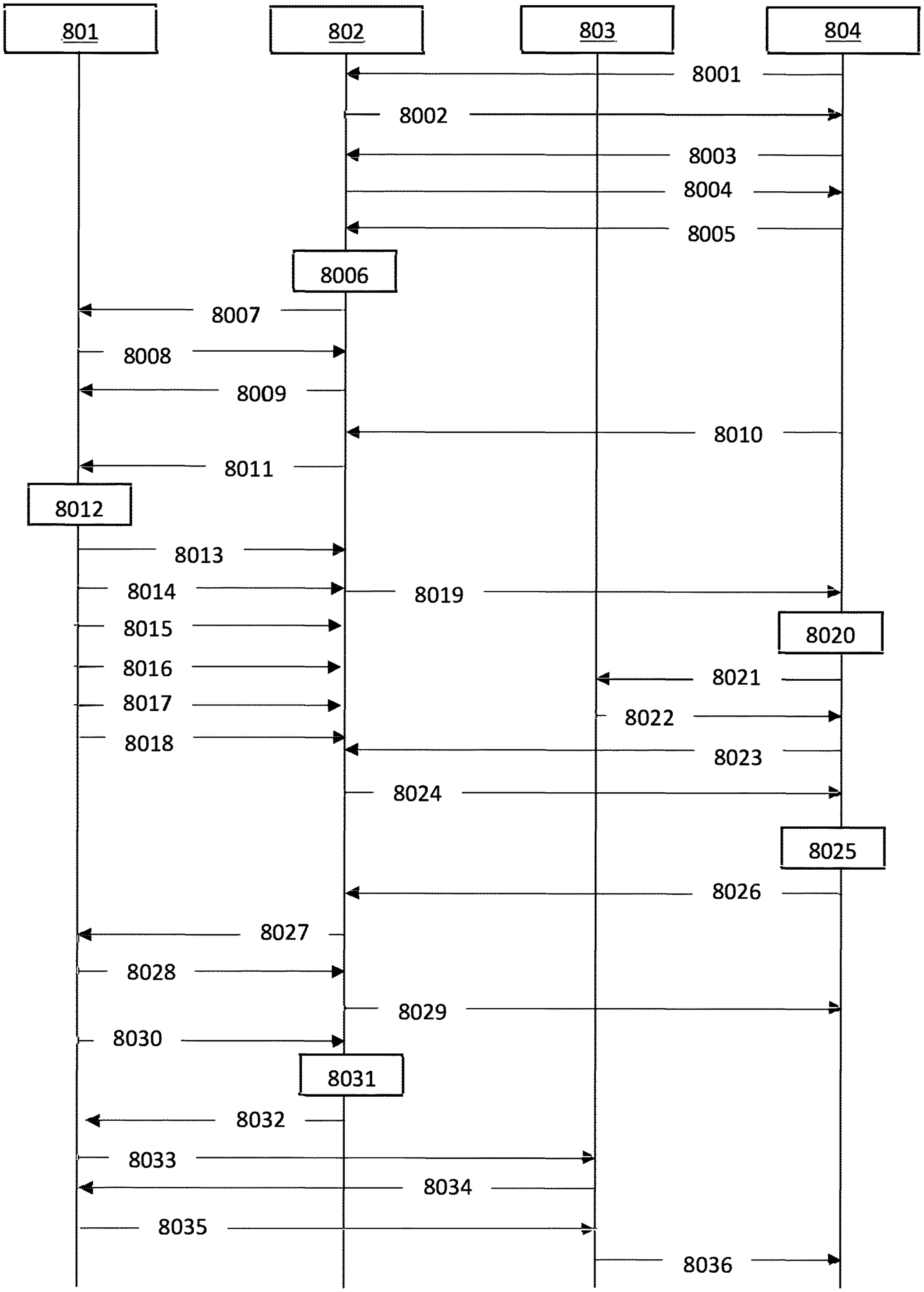
Figure 9:
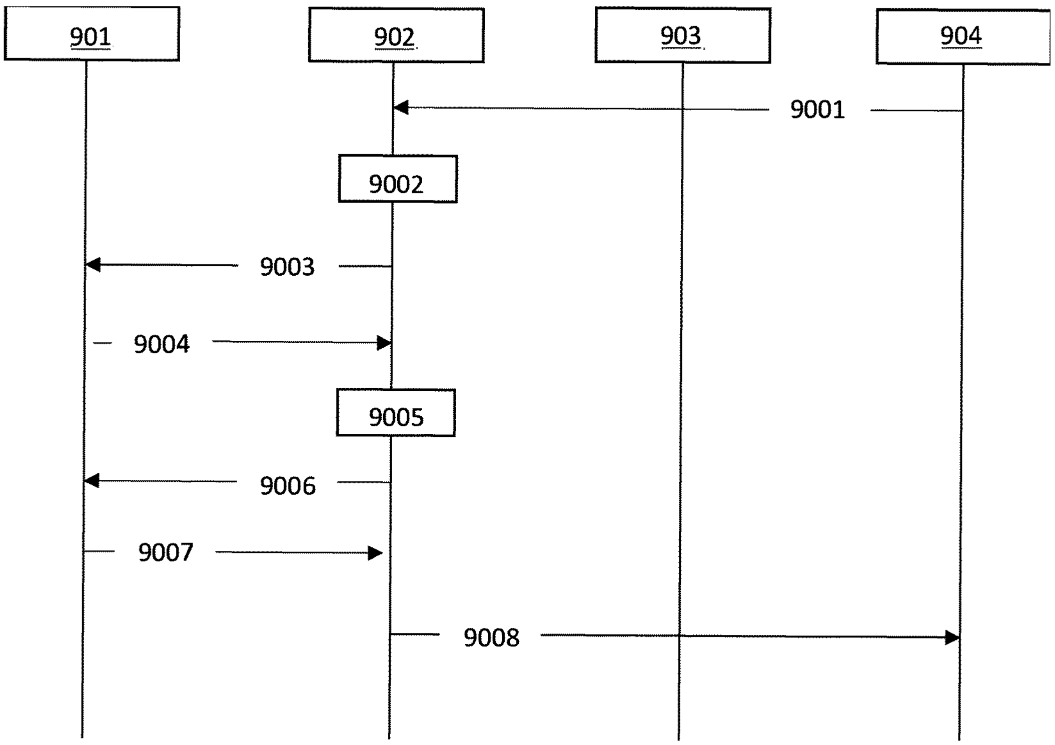
FIGS. 9 to 10 illustrate example signalling.
Figure 10:
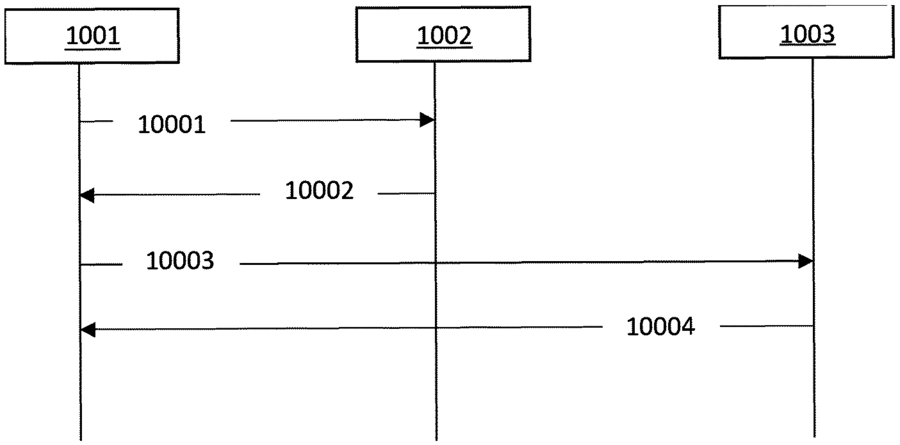

A first example mechanism is illustrated with respect to FIG. 8, a second example mechanism is illustrated with respect to FIG. 9, and a third mechanism that may be used in any of the mechanisms of FIGS. 8 and/or FIG. 9 is illustrated with respect to FIG. 10.

FIG. 8 illustrates signalling that may be performed between a UE 801, a source DU 802 initially serving the UE 801, a target DU 803, and a CU 804. In this example, a UE is configured with L1 measurement reporting configuration in a so-called deactive mode, along with an L3 measurement reporting configuration. In the present case, the "deactive mode" refers to a mode in which the L1 measurement reporting configuration stored at a UE is not executed by the UE until a trigger event is deemed to have occurred.

In this example of FIG. 8, the network decides whether the L1 measurement configuration will be configured as deactive. This may be decided by the CU 804 and/or by the source DU 802. 8001 to 8002 and 8003 to 8004 are different mechanisms for a causing the source DU 802 and the CU 804 to both become aware that deactive L1 measurement reporting is to be configured at the UE 801.

During 8001, the CU 804 signals the source DU 802. This signalling may comprise a request for configurations for L1 measurement reporting of the UE 801. This signalling may comprise an indication that deactive L1 measurement reporting is to be configured at the UE 801. This signalling may request that UE configurations provided by the source DU configure deactive L1 reporting for the UE 801. This signalling may be comprised in a UE context modification request service operation.

During 8002, the source DU 802 provides an acknowledgement to the deactive L1 reporting request of 8001. This acknowledgment may comprise the configurations requested by CU 804. The source DU 802 may further acknowledge that the L1 measurement report is configured deactive in the signalled configurations. After 8002, the mechanism proceeds to 8005.

As mentioned above, 8003 to 8004 may be performed instead of 8001 to 8002 for achieving an analogous function. During 8003, the CU 804 signals the source DU 802. This signalling may comprise a request for configurations for L1 measurement reporting of the UE 801. This signalling may comprise a UE context modification request service operation. This signalling may be silent with respect to whether the UE 801 is to have deactive L1 reporting configured.

During 8004, the source DU 802 provides an acknowledgment to the CU 804 for the signalling of 8003. This acknowledgment may comprise the configurations requested by CU 804. The source DU 802 may further comprise an indication that the L1 measurement report is configured deactive in the signalled configurations. After 8004, the mechanism proceeds to 8005.

The activation status of the configuration in any of 8002 and 8004 may be indicated in a number of different ways. For example, the L1 measurement report may be indicated as being configured deactive using a binary flag (e.g., 1 for active and 0 for deactive), or some other indicator having a similar function.

The following describes two different mechanisms for allowing L1 measurement reporting to be initiating with reference to 8005 to 8009 and 8010 to 8013. Both of these examples proceeds to 8014 subsequent to 8009 and/or 8013 being performed.

8005 to 8009 relate to an example in which the serving cell activates the L1 measurement reporting by reconfiguring UE upon receiving L3 measurement report. In this example, the UE can start reporting the L1 measurements shortly after the L3 measurement report (triggering the handover preparation) is sent since the serving cell activates the reporting without waiting for the target cell preparation.

During 8005, the CU 804 generates a message that comprises the deactive L1 measurement reporting configuration for the UE and signals this message to the source DU 802. This message may further comprise an L1 measurement report activation configuration for instructing the DU 802 to know when to implement the L1 measurement reporting at the UE 801.

For example, this message of 804 may indicate that the L1 measurement report is deactive (if not otherwise indicated during any of 8001 to 8004), and that the source DU 802 should store the L1 measurement report activation configuration along with the activation condition. The activation condition may, for example, be based on a measurement identifier to be comprised, by the UE, in an L3 measurement report in a way such that the source DU can decode it.

In another example, the activation condition may be based on another indication that is configured by the CU 804 that is different to the measurement ID. What may serve as "another indication" may be configured at the UE in a number of different forms. For example, the UE may be configured with an activation condition that has an identifier (not the L3 measurement report ID but a separate ID for LTM). Once the activation condition is satisfied, the UE may send the indication or identifier that refers to that condition. A DU on receiving this indication or identifier may associate that receipt with initiating an activation procedure. Herein, the activation condition can be based on at least one of a Reference Signal Receive Power (RSRP), a Reference Signal Receive Quality (RSRQ), a signal to interference and noise ratio (SINR), a UE coordinate, and/or a Universal Time Coordinated (UTC) time.

For example, other types of conditions that may trigger this autonomous reporting may comprise at least one of the following:

- A property of the serving cell is determined to become better than a first threshold;
- A property of the serving cell is determined to become worse than a second threshold;
- A neighbor cell is determined to become offset better than serving cell;
- A neighbor cell is determined to become better than an offset;
- A property of the serving cell is determined to become worse than a third threshold and said property of a neighbor cell is determined to become better than a fourth threshold;
- A property of a neighbor cell is determined to become better than a fifth threshold;
- A property of an inter-Radio Access Technology (RAT) neighbor is determined to become better than a sixth threshold;
- A property of a Primary Cell (PCell) is determined to become worse than a seventh threshold, and said property of an inter RAT neighbor is determined to become better than an eighth threshold;
- A measured interference is determined to become higher than a ninth threshold;
- When the UE coordinates are a tenth threshold distance (or more) away from coordinate 1; and an eleventh threshold (or less) distance closer from the coordinate 2; and/or
- When the UE timer is later than the configured UTC timer.

The message of 804 may further comprise an instruction to the source DU to send L1 measurement report activation command to the UE upon receiving the associated L3 measurement report, measurement report ID, or any other indication that was configured by the CU in 8005.

During 8006, the source DU 802 stores the L1 measurement report activation command received during 8005 and starts monitoring the L3 measurement reports or any other indications that needs to be sent by the UE 801 to send the L1 measurement report activation command.

In one example, the source DU 802 may know how to generate the L1 measurement report activation command itself. In such a case, the source DU 802 may generate the L1 measurement configuration command without receiving this from the CU 804. In such a case, the CU 804 will not generate the L1 measurement configuration.

During 8007, the source DU 802 signals the UE 801. This signalling may comprise the deactive L1 measurement report configuration that indicates that the measurement configuration is deactive. As the configuration is indicated as being deactive, the UE does not start L1 measurement reporting.

During 8008, the UE 801 signals the source DU 802. This signalling may comprise an L3 measurement report. This signalling may comprise an indication that an L1 measurement report activation condition has been met, and so should be activated.

In one example, the signalling of 8007 may comprise the L3 measurement report, along with the measurement ID outside the L3 measurement report so that the source DU can identify which L3 measurement report is sent. This measurement ID may be in the Media Access Control (MAC) Packet Data Unit (PDU) header so that the DU can decode the measurement ID information.

In another example, the UE may send the measurement ID to the source DU 802 without sending the full L3 report. This may be sufficient for the network to activate L1 measurement report and trigger the handover preparation procedure and to make sure that the condition is met.

In another example, the UE may send an indication that the L1 measurement reporting condition is met (where the indication relates to a condition other than the measurement ID).

During 8009, the source DU 802 signals the UE 801. This signaling may comprise an L1 measurement report activation command for activating the L1 measurement reporting configuration of the UE.

8010 to 8013 relate to an example in which UE 801 activates L1 reporting autonomously once the L3 measurement report is sent and/or when any other preconfigured condition is met (such as mentioned above in relation to the signalling of 8005). In this example, the UE 801 can start reporting the L1 measurements even earlier than that allowed by the mechanism of 8005 to 8009 as the UE has all the information for starting the L1 measurements.

During 8010, the CU generates the message that contains the deactive L1 measurement reporting configuration along with the L1 measurement report activation configuration to the UE. At least one of the CU 804 or the source DU 802 may determine whether the UE 801 is to be configured to autonomously initiate L1 measurement reporting. When the CU 804 is the entity that makes this decision for autonomous initiation, the generated message may comprise an indication to the effect that the UE 801 is to be configured for the autonomous activation.

During 8011, the source DU 802 signals the UE 801. This signalling may comprise the deactive L1 measurement report configuration that indicates that the measurement configuration is deactive. As the configuration is indicated as being deactive, the UE does not start L1 measurement reporting. The signalled measurement report configuration of 8011 comprises an indication to instruct the UE to perform autonomous activation of the L1 measurement reporting when a set of criteria is reached. As mentioned previously, this indication may have been received from the CU 804 during 8010, or generated by the source DU 802

During 8012, the UE 801 determines that criteria signalled during 8011 for autonomous activation of the L1 measurement reporting has been met. For example, the UE 801 may determine that a L3 measurement reporting condition associated with the L1 measurement reporting condition has been met. It is understood that a condition other than the L3 measurement reporting condition may be used to trigger this autonomous reporting.

As mentioned above, the activation condition may be based on another indication that is configured by the CU 804 that is different to the measurement ID. What may serve as "another indication" may be configured at the UE in a number of different forms. For example, the UE may be configured with an activation condition that has an identifier (not the L3 measurement report ID but a separate ID for LTM). Once the activation condition is satisfied, the UE may send the indication or identifier that refers to that condition. A DU on receiving this indication or identifier may associate that receipt with initiating an activation procedure. Herein, the activation condition can be based on at least one of a Reference Signal Receive Power (RSRP), a Reference Signal Receive Quality (RSRQ), a signal to interference and noise ratio (SINR), a UE coordinate, and/or a Universal Time Coordinated (UTC) time.

For example, other types of conditions that may trigger this autonomous reporting may comprise at least one of the following:

- A property of the serving cell is determined to become better than a first threshold;
- A property of the serving cell is determined to become worse than a second threshold;
- A neighbor cell is determined to become offset better than serving cell;
- A neighbor cell is determined to become better than an offset;
- A property of the serving cell is determined to become worse than a third threshold and said property of a neighbor cell is determined to become better than a fourth threshold;
- A property of a neighbor cell is determined to become better than a fifth threshold;
- A property of an inter-Radio Access Technology (RAT) neighbor is determined to become better than a sixth threshold;
- A property of a Primary Cell (PCell) is determined to become worse than a seventh threshold, and said property of an inter RAT neighbor is determined to become better than an eighth threshold;
- A measured interference is determined to become higher than a ninth threshold;
- When the UE coordinates are a tenth threshold distance (or more) away from coordinate 1; and an eleventh threshold (or less) distance closer from the coordinate 2; and/or
- When the UE timer is later than the configured UTC timer.

In response to determining that the criteria has been met, the UE 801 activates the L1 measurement reporting.

During 8013, the UE 801 signals the source DU 802. This signalling may comprise the L3 measurement report comprising an indicator to activate the L1 measurement reporting (e.g., as described in relation to 8008). In other words, this signalling may comprise an indicator having a function of informing the network that autonomous activation of L1 measurement reporting has been initiated by the UE. In another example, the UE may send the indication that the L1 measurement reporting condition is met along with the first L1 measurement report.

As the UE 801 has activated the L1 measurement reporting, 8014-8018 indicate L1 measurement reports signalled from the UE 801 to the source DU 802 prior to the target DU 803 being prepared for the UE 801 and an RRC reconfiguration being received by the UE 801 for accessing the target DU 803. 8014 to 8018 are performed contemporaneously to at least one of 8019 to 8026. 8019 to 8026 correspond to operations performed during 6002 to 6009.

During 8019, the source DU 802 signals the CU 804. This signalling may comprise the measurement report received during 8013. This signalling may comprise an uplink (UL) RRC message transfer service operation.

During 8020, the CU 804 may make a target cell preparation decision for a mobility-based operation such as, for example, handover. For example, the CU 804 may use the reported measurements of 8019 to identify a set of candidate target cells to which the UE may be handed over to. In the present example, the CU 804 identifies candidate target cells that are served by either source DU 802 or target DU 803, which are both controlled by CU 804.

During 8021, the CU 604 signals the target DU 803. This signalling may request that the target DU 803 prepares at least one candidate target cell for access by the UE 801. This signalling may comprise a UE context setup request service operation.

During 8022, the target DU 803 responds to the signalling of 8021. This response may comprise a configuration to be applied by the UE for accessing a candidate cell prepared by the target DU 803 in response to the signalling of 8021. It is understood that the target DU 803 may provide multiple configurations to be applied by the UE for accessing respective candidate cells prepared by the target DU 803 in response to the signalling of 8021. The configuration may comprise UE-specific parts and non-UE-specific parts. The signalling of 6005 may comprise a UE context setup response service operation.

During 8023, the CU 804 signals the source DU 802. This signalling may comprise a request for the source DU to prepare at least one candidate target cell controlled by the source DU 802 for the UE. This signalling may comprise a UE context modification request service operation.

During 8024, the source DU 802 responds to the signalling of 8023. This response may comprise a configuration to be applied by the UE for accessing a candidate cell prepared by the source DU 802 in response to the signalling of 8023. It is understood that the source DU 802 may provide multiple configurations to be applied by the UE for accessing respective candidate cells prepared by the source DU 802 in response to the signalling of 8023. The configuration may comprise UE-specific parts and non-UE-specific parts. The signalling of 8024 may comprise a UE context modification response service operation.

During 8025, after having received the UE configurations during 8022 and 8024, the CU 804 generates an RRC Reconfiguration to be applied by the UE. This RRC Reconfiguration may comprise a measurement reporting configuration for LTM configurations and parameters discussed above in relation to 6008.

During 8026, the CU 804 signals the source DU 802. This signalling may comprise the RRC Reconfiguration generated during 8025. This signalling may be comprised in a downlink RRC message transfer service operation, although it is understood that this is not the only service operation that may be used.

During 8027, the source DU 802 signals the UE 801. This signalling may comprise the RRC Reconfiguration received by the source DU 802 during 8026.

During 8028, the UE confirms receipt of the signalling of 8027. This may be performed after the UE 601 has performed at least part of the RRC Reconfiguration received during 8027.

During 8029, the source DU 802 signals the CU 804 to inform the CU 804 that the RRC Reconfiguration has been acknowledged by the UE 801. This signalling of 8029 may be provided using an uplink RRC message transfer service operation.

During 8030, the UE 801 signals the source DU 802. This signalling may comprise at least one L1 measurement report that was performed in accordance with the RRC reconfiguration received by the UE 801 during 8027, and may comprise L1 measurement reports.

8031 to 8036 relate to an execution phase, such as described above in relation to 6014 to 6019 relate to an execution phase.

During 8031, the source DU 802 determines, based on the measurements comprised in the L1 measurement reports of at least one of 8014 to 8018 (and potentially 8030), that the UE would be better served by a target candidate cell (target DU 803 in the present example). For example, during 8031, the source DU 802 may determine that target DU 803 has a better radio link/beam measurements for the UE 801 than what is currently being provided by the source SN 802 (e.g., L1-Reference-Signal-Received Power (RSRP) of target beam measurement>L1-RSRP of serving beam measurement and an Offset for a time period (i.e. Time-to-Trigger (TTT) period).

This determination of 8031 may benefit from using values comprised in measurement reports received during 8014 to 8018 in addition to the L1 measurement reports received during 8030. This means that the source DU 802 may execute the LTM immediately, after 8028 if the previous L1 measurements (8014 to 8018) shows that the LTM execution condition has been already satisfied.

During 8032, the source DU 802 signals the UE 801. This signalling may comprise a trigger for causing the UE to perform a cell change operation to stop being served by the source DU 802 and instead be served by the target DU 803. This signalling may be performed in response to the determination of 8031. This signalling may be comprised in a MAC Control Element (MAC CE).

During 8033, following receipt of the trigger of 8032, the UE 801 initiates a random access procedure with the target DU 803 for being served by the DU 803.

During 8034, the target DU 803 provides a random access response to the UE 801 in response to the signalling of 8016.

During 8035, the UE 601 signals the target DU 803. This signalling may comprise an indication that an RRC Reconfiguration operation has been performed such that the UE 801 is now being served by the target DU 803. This signalling may be comprised in an RRC Reconfiguration complete service operation.

During 8036, the target DU 803 forwards the received indication of 8035 to the CU 604. This signalling may be comprised in an uplink RRC message transfer service operation.

FIG. 9 illustrates operations relating to a second mechanism. For this second mechanism, a serving cell configures L1 reporting upon receiving the L3 measurement report without waiting for LTM preparation of the target cell.

For example, a CU may provide an L1 measurement reporting configuration to a source DU in advance of instructing a target DU to prepare a cell for measurement reporting. The source DU will send the L1 measurement reporting configuration to the UE when an L3 measurement report is received from the UE that is associated with the L1 measurement configuration, and/or when any other preconfigured execution condition has been met, such as described below in relation to 9001. The example of FIG. 9 may be performed following any of 8002 and/or 8004.

FIG. 9 illustrates operations that may be performed by a UE 901, a source DU 902, a target DU 903, and a CU 904. It is understood that although the present example of FIG. 9 is described in terms of using an L3 measurement identifier for triggering a source DU 902 to signal an L1 measurement configuring to a UE, that other indications may be sent by the UE to trigger this L1 measurement configuration.

During 9001, the CU 904 signals the source DU 902. This signalling may comprise an L3 measurement reporting configuration for configuring the UE to perform L3 measurement reporting. This L3 measurement reporting configuration may be for configuring the UE 901 to, when reporting the L3 measurement to the source DU 902, provide an identifier for that L3 measurement reporting outside the RRC message (e.g., in a PDU MAC header) or in some other way that the source DU 902 can decode the identifier. This identifier may comprise an L3 measurement reporting ID.

In an example, the signalled configuration may be for configuring the UE with a separate condition such that the UE reports to the source DU 902 that the L1 measurement reporting condition of a target cell is met. This may be a configuration along with the L3 measurement reporting configuration or a separate configuration.

The signalling of 9001 may also comprise an L1 measurement reporting configuration. The signaling of 9001 may comprise an RRC message that instructs the source DU 902 to buffer the L1 measurement configuration at the source DU until an associated L3 measurement is received (i.e., an associated L3 measurement is received that has a respective measurement ID identified in the signalling of 9001), and/or until any other preconfigured execution condition has been met.

For example, as mentioned above, the activation condition may be based on another indication that is configured by the CU 804 that is different to the measurement ID. What may serve as "another indication" may be configured at the UE in a number of different forms. For example, the UE may be configured with an activation condition that has an identifier (not the L3 measurement report ID but a separate ID for LTM). Once the activation condition is satisfied, the UE may send the indication or identifier that refers to that condition. A DU on receiving this indication or identifier may associate that receipt with initiating an activation procedure. Herein, the activation condition can be based on at least one of a Reference Signal Receive Power (RSRP), a Reference Signal Receive Quality (RSRQ), a signal to interference and noise ratio (SINR), a UE coordinate, and/or a Universal Time Coordinated (UTC) time.

For example, other types of conditions that may trigger this autonomous reporting may comprise at least one of the following:

A property of the serving cell is determined to become better than a first threshold;

A property of the serving cell is determined to become worse than a second threshold;

A neighbor cell is determined to become offset better than serving cell;

A neighbor cell is determined to become better than an offset;

A property of the serving cell is determined to become worse than a third threshold and said property of a neighbor cell is determined to become better than a fourth threshold;

A property of a neighbor cell is determined to become better than a fifth threshold;

- A property of an inter-Radio Access Technology (RAT) neighbor is determined to become better than a sixth threshold;
- A property of a Primary Cell (PCell) is determined to become worse than a seventh threshold, and said property of an inter RAT neighbor is determined to become better than an eighth threshold;
- A measured interference is determined to become higher than a ninth threshold;
- When the UE coordinates are a tenth threshold distance (or more) away from coordinate 1; and an eleventh threshold (or less) distance closer from the coordinate 2; and/or
- When the UE timer is later than the configured UTC timer.

During 9002, the source DU 902 buffers/stores the L1 measurement reporting configuration received during 9002.

During 9003, the source DU 902 signals the UE 901. This signalling may comprise the L3 measurement reporting configuration received during 9001. This signalling of 9003 may comprise an instruction to the UE to provide said identifier of the L3 measurement report at a lower level (e.g., in said MAC PDU header). The signaling of 9003 may not comprise the L1 measurement reporting configuration received during 9001.

During 9004, the UE 901 signals the source DU 902. This signalling may comprise an L3 measurement report and its associated Measurement ID (or any other indication). The measurement ID (or any other indication) may be sent to source DU in a way such that the source DU can decode the measurement ID (or any other indication, such as described above in relation to 9001), e.g., in PDU MAC header.

During 9005, the source DU 902 determines that the associated L3 measurement ID (or any other indication mentioned above in relation to 9001) associated with the buffered L1 measurement configuration has been received.

In response to the determination of 9005, during 9006 the source DU 902 signals the UE. This signalling of 9006 may comprise the buffered L1 measurement report configuration for triggering the UE to initiate L1 measurement reporting.

During 9007, the UE 901 signals an L1 measurement report to the source DU 902 without waiting for an LTM preparation procedure to be completed with a target DU 903.

During 9008, the source DU 902 signals the CU 904. This signalling may comprise the L3 measurement report received during 9004. This signalling may comprise an L3 Measurement report service operation.

It is understood that although the present example illustrates 9008 being performed after 9007, these steps may be reversed.

Although not shown, the rest of the signalling diagram of FIG. 9 may proceed from 8014 of FIG. 8.

In both of the above examples of FIGS. 8 and 9, the UE is configured with L1 measurement reporting (either by source DU or autonomously) right after the L3 measurement report is sent or a specified condition is met. This allows for a source DU serving the UE to monitor the necessary L1 measurement reports until the preparation of the target DU is completed. Thus, the source DU can initiate the execution of an LTM procedure immediately (or soon) after the preparation of the target DU is completed. Therefore, the L1 measurement reporting period after the preparation phase may be reduced and the mobility robustness due to late execution of the LTM is avoided.

As the UE is to be configured with the uplink resources (e.g., Physical Uplink Control Channel (PUCCH), and to report the L1 measurements over those resources, some modifications may be made to the procedure of FIG. 6 in order to more efficiently use PUCCH resources. This is because, in the base LTM procedure shown in FIG. 6, the PUCCH resources may be configured along with the L1 measurement reporting configuration. In the examples of FIGS. 7 and 8, including the PUCCH resource allocations in the L1 measurement reporting may lead PUCCH resource shortage or overbooking of resources if those resources are reserved without being used in the L1 measurement configurations for a long period of time.

In the autonomous initiation example of 8010 to 8013, the longer PUCCH resource reservation is inevitable since the UE triggers the L1 measurement autonomously and it requires the PUCCH configuration to report those measurements immediately.

However, the longer PUCCH resource reservation issue may be mitigated and/or avoided in the examples of 8005 to 8009 and FIG. 9 by only providing/configuring the PUCCH resources are provided to the UE only when they will be used by the UE.

This means that, in the examples above, the source DU 802 may provide the UE 801 with PUCCH resources for reporting L1 measurements along with the L1 measurement reporting activation command during 8009. Similarly, the source DU 902 may provide the UE 901 with PUCCH resources for reporting L1 measurements along with the L1 measurement reporting activation command during 9006. In contrast, the source DU 802 may provide the UE 801 with PUCCH resources for reporting L1 measurements along with the L1 measurement reporting activation command during 9011.

In the above examples, it may happen that the CU can generate the L1 measurement reporting configuration for a cell of a target DU without contacting target DUs in each LTM preparation. Therefore, as a supplement to the above examples of FIGS. 8 and 9, a mechanism is proposed below such that the CU can generate the L1 measurement configuration without repeatedly communicating to any DU. This is illustrated with respect to FIG. 10.

FIG. 10 illustrates signalling that may be performed between a CU 1001, a first DU 1002, and a second DU 1003.

During 10001, the CU 1001 signals the first DU 1002. This signaling may comprise an F1 setup request. This signaling may comprise a request for L1 reporting-related configurations.

During 10002, the first DU 1002 responds to the signalling of 10001. This signalling may comprise the requested L1 reporting-related configurations. This may be as described above in relation to FIG. 6.

During 10003, the CU 1001 signals the second DU 1003. This signaling may comprise an F1 setup request. This signaling may comprise a request for L1 reporting-related configurations.

During 10004, the second DU 1003 responds to the signalling of 10002. This signalling may comprise the requested L1 reporting-related configurations. This may be as described above in relation to FIG. 6.

Aspects of the above examples are illustrated below with reference to FIGS. 11 to 14.

Figure 11:
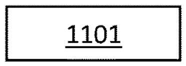
FIGS. 11 to 14 illustrate example operations that may be performed by apparatus described herein.

FIG. 11 illustrates operations that may be performed by a centralized unit of a radio access network.

During 1101, the centralized unit signals, to a distributed unit of the radio access network, a layer 1 measurement reporting configuration to be executed by a user equipment as part of a lower layer mobility procedure and at least one activation condition for autonomous execution of the layer 1 reporting configuration. The at least one activation condition may aid autonomous execution in that at least one of the user equipment and the distributed unit may trigger the layer 1 reporting configuration to be executed without receiving an instruction to do so (or some other trigger) from the centralized unit.

The centralized unit may further signal a layer 3 measurement reporting configuration to the distributed unit, the layer 3 measurement reporting configuring comprising an instruction for the user equipment to signal a measurement identifier for layer 3 measurement reports using a layer 2 header.

The signalling of the layer 1 measurement reporting configuration may comprise an instruction for the distributed unit to abstain from signalling the layer 1 measurement reporting configuration to the user equipment until an indication fulfilling at least one of the at least one activation conditions is received from the user equipment. The indication may indicate that at least one of the at least one activation conditions has been fulfilled, and/or comprise a measurement value from which the distributed unit may determine that at least one of the at least one execution conditions has been fulfilled.

Said layer 1 measurement reporting configuration may comprise an instruction instructing the distributed unit to abstain from signalling the layer 1 measurement reporting configuration to the user equipment before an indication fulfilling at least one of the at least one activation conditions is received from the user equipment.

The layer 1 measurement reporting configuration may comprise an instruction for the distributed unit to trigger execution of the layer 1 measurement reporting configuration at the user equipment after receipt at the distributed unit of the indication fulfilling at least one of the at least one activation conditions is received from the user equipment.

Said layer 1 measurement reporting configuration may comprise an instruction for the user equipment to autonomously execute the layer 1 measurement reporting configuration when at least one of the at least one activation conditions is fulfilled.

The centralized unit may, after receiving, from the user equipment, an indication that at least one of the at least one activation conditions has been fulfilled: determine that a mobility procedure is to be performed for said user equipment; obtain respective configurations for a set of target cells for the user equipment; generate a new layer 1 measurement reporting configuration using said respective configurations; and signal said new layer 1 measurement reporting configuration to the distributed unit to be executed by the user equipment as part of a lower layer mobility procedure.

The centralized unit may: receive respective layer 1 measurement reporting configurations from a plurality of distributed units; and generate said layer 1 measurement reporting configuration using said received respective layer 1 measurement reporting configurations. Said receiving respective layer 1 measurement reporting configurations may be performed when establishing respective interfaces between the distributed unit and the centralized unit (e.g., when establishing an F1 interface).

Figure 12:
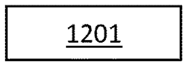

FIG. 12 illustrates operations that may be performed by a distributed unit of a radio access network. This distributed unit may be the distributed unit mentioned above in respect to FIG. 11.

During 1201, the distributed unit receives, from a centralized unit of the radio access network, a layer 1 measurement reporting configuration to be executed by a user equipment as part of a lower layer mobility procedure, and at least one activation condition for autonomous execution of the layer 1 reporting configuration. As mentioned above, the at least one activation condition may aid autonomous execution in that at least one of the user equipment and the distributed unit may trigger the layer 1 reporting configuration to be executed without receiving an instruction to do so (or some other trigger) from the centralized unit.

The distributed unit may be configured to determine whether the at least one activation condition is to be triggered by the distributed unit. When the at least one activation condition is to be monitored and/or triggered by the distributed unit, the distributed unit may evaluate that the at least one activation condition has been fulfilled, and signal a trigger to the user equipment for causing the user equipment to execute the layer 1 reporting configuration. When the at least one activation condition is to be monitored and/or triggered by the user equipment, the distributed unit may provide the user equipment with both the activation condition and the layer 1 reporting configuration.

The distributed unit may: receive a layer 3 measurement reporting configuration comprising an instruction for the user equipment to signal a measurement identifier for layer 3 measurement reports using a layer 2 header; receive, from the user equipment, a layer 3 measurement report comprising said measurement identifier; and cause the layer 1 measurement report configuration to be executed at the user equipment in response to receiving said measurement identifier.

Receiving said layer 1 measurement reporting configuration may comprise receiving an instruction for the distributed unit to abstain from signalling the layer 1 measurement reporting configuration to the user equipment until an indication fulfilling at least one of the at least one activation conditions is received from the user equipment. In such a case, the distributed unit may: abstain from signalling the received layer 1 measurement reporting configuration to the user equipment; receive, from the user equipment, the indication fulfilling the at least one of the at least one activation conditions; and signal the received layer 1 measurement reporting configuration to the user equipment in response to said receiving the indication fulfilling the at least one of the at least one activation conditions.

Receiving said layer 1 measurement reporting configuration may comprise receiving an instruction for the distributed unit to abstain from signalling the layer 1 measurement reporting configuration to the user equipment before a layer 3 measurement report fulfilling at least one of the at least one activation conditions is received from the user equipment. In such a case, the distributed unit may signal the layer 1 and layer 3 measurement reporting configurations to the user equipment before receiving said indication fulfilling at least one of the at least one activation conditions.

Receiving said layer 1 measurement reporting configuration may comprise receiving an instruction for the distributed unit to trigger execution of the layer 1 measurement reporting configuration at the user equipment after receipt at the distributed unit of the indication fulfilling at least one of the at least one activation conditions is received from the user equipment. In such a case, the distributed unit may, in response to receiving the indication fulfilling at least one of the at least one activation conditions from the user equipment, signalling to the user equipment, a trigger for causing the user equipment to execute the layer 1 measurement reporting configuration.

Receiving said layer 1 measurement reporting configuration may comprise receiving an instruction for the user equipment to autonomously execute the layer 1 measurement reporting configuration when at least one of the at least one activation conditions is fulfilled. In such a case, the distributed unit may: provide, to the user equipment, the instruction for the user equipment to autonomously execute the layer 1 measurement reporting configuration when at least one of the at least one activation conditions is fulfilled; and subsequently receive layer 1 measurement reports in accordance with the layer 1 measurement reporting configuration. This subsequent receiving may be performed without the distributed signalling a trigger to the user equipment for causing the user equipment to execute the layer 1 measurement reporting configuration.

After receiving a layer 3 measurement report from the user equipment, the distributed unit may: signal the layer 3 measurement report from the user equipment to the centralized unit; receive, from the user equipment, at least one layer 1 measurement report in accordance with the received layer 1 measurement reporting configuration; determine, in dependence on the at least one layer 1 measurement report, that the user equipment is to be served by a target cell; and signal, to the user equipment, an instruction to access the target cell.

The distributed unit may: receive, from the centralized unit, a new layer 1 measurement reporting configuration for said user equipment; signalling said new layer 1 measurement reporting configuration to the distributed unit to be executed by the user equipment as part of a lower layer mobility procedure; and receive, from the user equipment, at least one layer 1 measurement report in accordance with the new layer 1 measurement reporting configuration, wherein said determining that the user equipment is to be served by the target cell may be further performed in dependence on the at least one layer 1 measurement report received in accordance with the new layer 1 measurement reporting configuration.

The distributed unit may transmit a respective layer 1 measurement reporting configuration to the centralized unit for use in generating said layer 1 measurement reporting configuration. Said transmitting said respective layer 1 measurement reporting configurations may be performed when establishing respective interfaces between the distributed unit and the centralized unit.

The distributed unit may signal, to the user equipment, physical uplink control channel resources for layer 1 measurement reporting with at least one of: said layer 1 measurement reporting configuration; or an instruction to activate, at the user equipment, a previously signalled layer 1 measurement reporting configuration.

Figure 13:
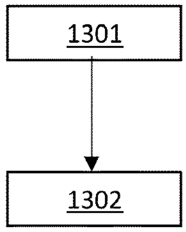

FIG. 13 illustrates operations that may be performed by a user equipment configured to operate with at least one of the apparatus of FIGS. 11 and/or 12.

During 1301, the user equipment may receive, from a distributed unit of a radio access network, a layer 1 measurement reporting configuration and at least one activation condition for autonomous execution of the layer 1 reporting configuration.

During 1302, the user equipment causes said layer 1 measurement reporting configuration to be executed when at least one of the at least one activation condition is fulfilled.

The causing said layer 1 measurement reporting configuration to be executed when at least one of the at least one activation condition is fulfilled may comprise autonomously signalling said at least one layer 1 measurement report after at least one of the at least one activation conditions has been fulfilled (i.e., without receiving a trigger to execute this from the distributed unit and/or the centralized unit).

Said causing said layer 1 measurement reporting configuration to be executed when at least one of the at least one activation condition is fulfilled may comprise: signalling, to the distributed unit, an indication that said at least one of the at least one activation conditions has been fulfilled; and receiving a trigger from the distributed unit that causes the user equipment to execute said layer 1 measurement reporting configuration.

Figure 14:
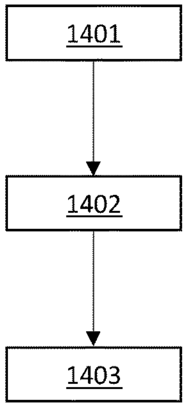

FIG. 14 illustrates operations that may be performed by a user equipment configured to operate with at least one of the apparatus of FIGS. 11 and/or 12.

During 1401, the user equipment receives, from a distributed unit of a radio access network, a layer 3 measurement reporting configuration and at least one activation condition for indicating that a layer 1 reporting configuration is to be executed.

During 1402, the user equipment determines that at least one of said at least one activation condition is fulfilled.

During 1403, the user equipment signals a layer 3 measurement report with an indication that at least one of the at least one activation condition is fulfilled.

The user equipment may receive, from the distributed unit, physical uplink control channel resources for layer 1 measurement reporting with at least one of: said layer 1 measurement reporting configuration; or an instruction to activate, at the user equipment, a previously signalled layer 1 measurement reporting configuration.

In all of the above examples of FIGS. 11 to 14, the layer 3 and layer 1 measurement reporting configurations may be comprised in a same message.

Further, it is understood that the above mentioned "conditions" may be considered to comprise criteria, or a criterion, depending on whether a combination of factors (or a single factor) has been set as being a prerequisite for the L1 measurement configuration to be executed.

Further, in all of the above examples of FIGS. 11 to 14, the at least one activation condition may comprise at least one of:

- a property of the serving cell is determined to become better than a first threshold;
- a property of the serving cell is determined to become worse than a second threshold;
- a neighbor cell is determined to become offset better than serving cell;
- a neighbor cell is determined to become better than an offset;
- a property of the serving cell is determined to become worse than a third threshold and said property of a neighbor cell is determined to become better than a fourth threshold;
- a property of a neighbor cell is determined to become better than a fifth threshold;
- a property of an inter-Radio Access Technology (RAT) neighbor is determined to become better than a sixth threshold;
- a property of a Primary Cell (PCell) is determined to become worse than a seventh threshold, and said property of an inter RAT neighbor is determined to become better than an eighth threshold;
- a measured interference is determined to become higher than a ninth threshold; coordinates of the user equipment are determined to be a tenth threshold distance (or more) away from coordinate 1, and an eleventh threshold (or less) distance closer from the coordinate 2; and/or
- a timer of the user equipment is determined to be later than a configured universal time coordinated timer.

It is understood that only one of these activation conditions may be fulfilled in order to determine that (and subsequently cause) the L1 measurement reporting configuration is to be executed. It may be that multiple (but less than all) of these activation conditions may be fulfilled in order to determine that (and subsequently cause) the L1 measurement reporting configuration to be executed. As mentioned above, whether at least one activation condition has been fulfilled may be determined autonomously by a user equipment and/or a distributed unit.

Figure 2:
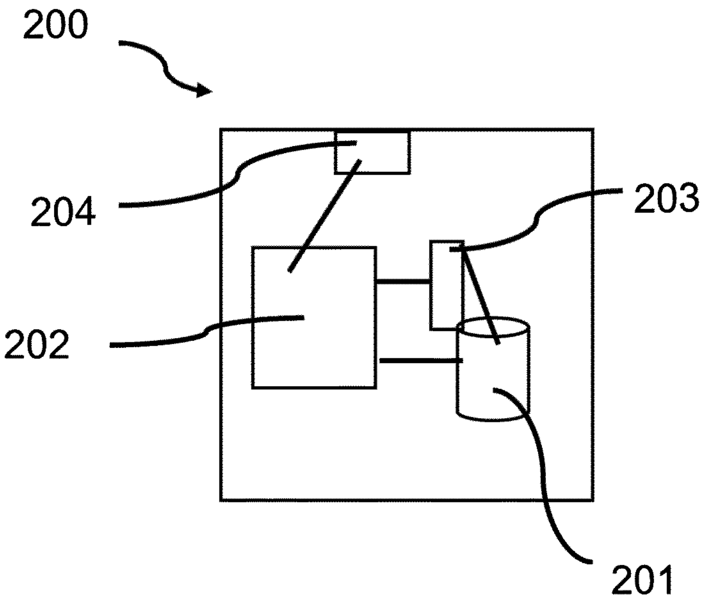
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
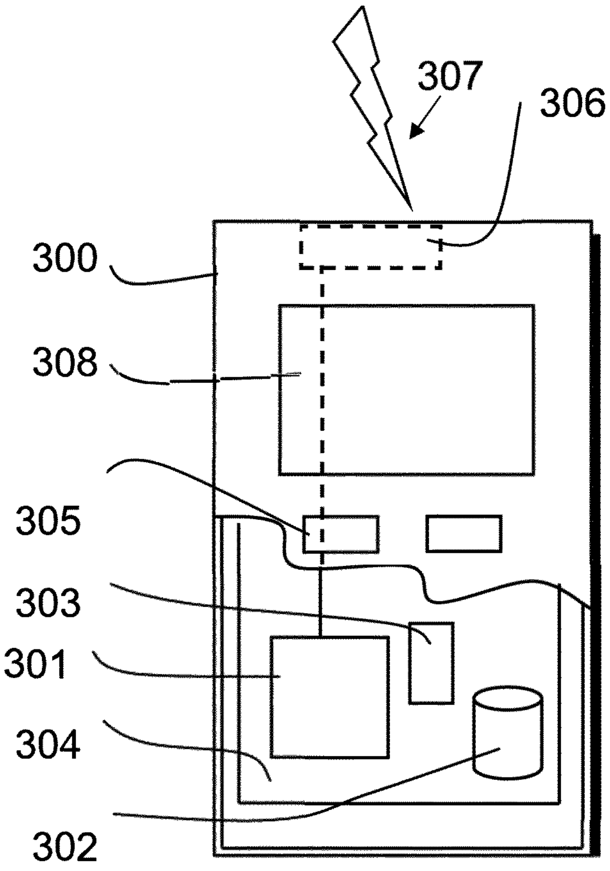
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of Tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
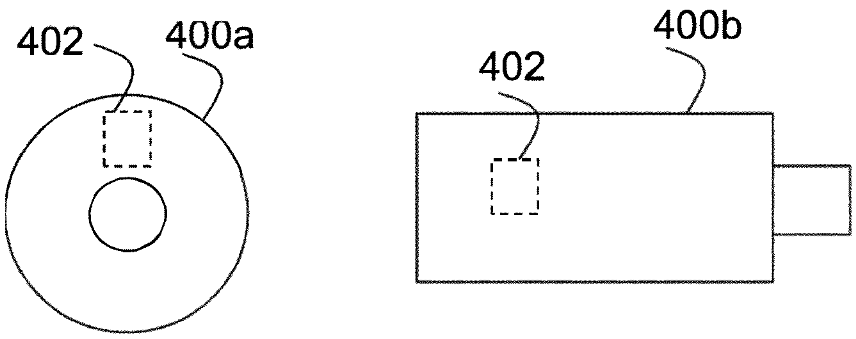
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of FIG. 11 and/or FIG. 13, and/or FIG. 12, and/or FIG. 14, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIG. 11 and/or FIG. 12, and/or FIG. 13, and/or FIG. 14, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multicore processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
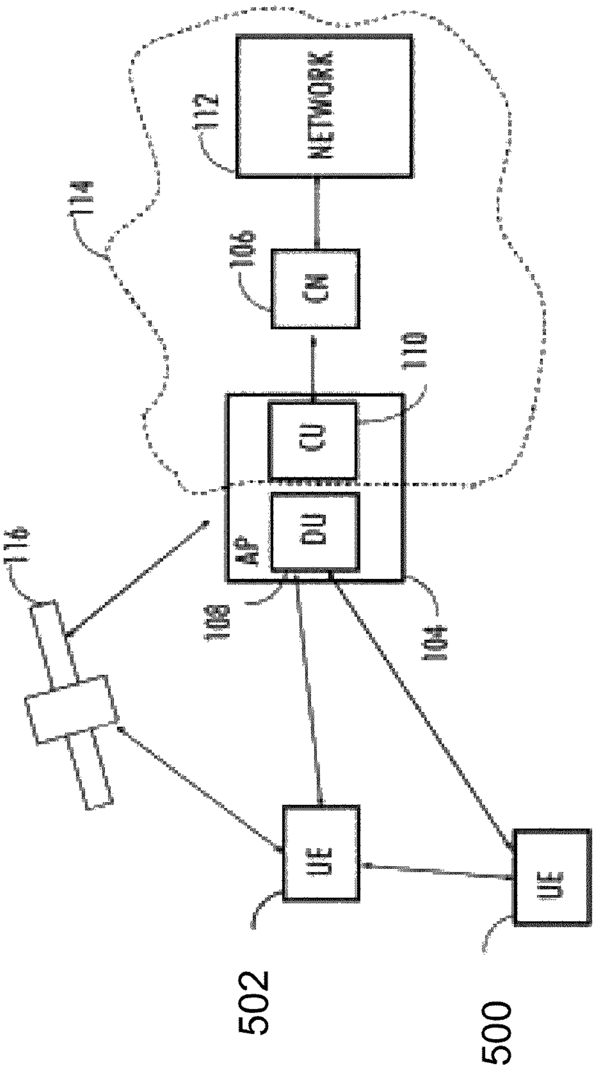
FIG. 5 shows a schematic representation of a network.

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input— multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells.

The invention claimed is:

1. A centralized unit of a radio access network, the centralized unit comprising at least one processor and at least one memory including computer code for one or more programs, the at least one memory and the computer code configured, with the at least one processor, to cause the centralized unit at least to:

signal, to a distributed unit of the radio access network, a layer 1 measurement reporting configuration to be executed by a user equipment as part of a lower layer mobility procedure and at least one activation condition for autonomous execution of the layer 1 reporting configuration, wherein said layer 1 measurement reporting configuration comprises an instruction for the distributed unit to abstain from signalling the layer 1 measurement reporting configuration to the user equipment before an indication fulfilling at least one of the at least one activation conditions is received from the user equipment.

2. The centralized unit as claimed in claim 1, the centralized unit being further configured to signal a layer 3 measurement reporting configuration to the distributed unit, the layer 3 measurement reporting configuring comprising an instruction for the user equipment to signal a measurement identifier for layer 3 measurement reports using a layer 2 header.

3. The centralized unit as claimed in claim 1, wherein said layer 1 measurement reporting configuration comprises an instruction for the distributed unit to trigger execution of the layer 1 measurement reporting configuration at the user equipment after receipt at the distributed unit of the indication fulfilling at least one of the at least one activation conditions is received from the user equipment.

4. The centralized unit as claimed in claim 1, wherein said layer 1 measurement reporting configuration comprises an instruction for the user equipment to autonomously execute the layer 1 measurement reporting configuration when at least one of the at least one activation conditions is fulfilled.

5. The centralized unit as claimed in claim 1, the centralized unit being further configured caused to, after receiving, from the user equipment, an indication that at least one of the at least one activation conditions has been fulfilled:

determine that a mobility procedure is to be performed for said user equipment;

obtain respective configurations for a set of target cells for the user equipment;

generate a new layer 1 measurement reporting configuration using said respective configurations; and signal said new layer 1 measurement reporting configuration to the distributed unit to be executed by the user equipment as part of a lower layer mobility procedure.

6. The centralized unit as claimed in claim 1, the centralized unit being further caused to:

receive respective layer 1 measurement reporting configurations from a plurality of distributed units; and generate said layer 1 measurement reporting configuration using said received respective layer 1 measurement reporting configurations.

7. The centralized unit as claimed in claim 6, wherein the centralized unit is caused to receive the respective layer 1 measurement reporting configurations when establishing respective interfaces between the distributed unit and the centralized unit.

8. A distributed unit of a radio access network, the distributed unit comprising at least one processor and at least one memory including computer code for one or more programs, the at least one memory and the computer code configured, with the at least one processor, to cause the distributed unit at least to:

receive, from a centralized unit of the radio access network, a layer 1 measurement reporting configuration to be executed by a user equipment as part of a lower layer mobility procedure, and at least one activation condition for autonomous execution of the layer 1 reporting configuration; and signal, to the user equipment, the layer 1 measurement reporting configuration and the at least one activation condition, wherein said layer 1 measurement reporting configuration comprises an instruction for the distributed unit to abstain from signalling the layer 1 measurement reporting configuration to the user equipment before an indication fulfilling at least one of the at least one activation conditions is received from the user equipment.

9. The distributed unit as claimed in claim 8, the distributed unit being further caused to:

receive a layer 3 measurement reporting configuration comprising an instruction for the user equipment to signal a measurement identifier for layer 3 measurement reports using a layer 2 header:

receive, from the user equipment, a layer 3 measurement report comprising said measurement identifier; and cause the layer 1 measurement report configuration to be executed at the user equipment in response to receiving said measurement identifier.

10. The distributed unit as claimed in claim 8, wherein activation conditions is received from the user equipment, the distributed unit being is further caused to:

receive, from the user equipment, the indication fulfilling the at least one of the at least one activation conditions; and signal the received layer 1 measurement reporting configuration to the user equipment in response to said receiving the indication fulfilling the at least one of the at least one activation conditions.

11. A user equipment, comprising at least one processor and at least one memory including computer code for one or more programs, the at least one memory and the computer code configured, with the at least one processor, to cause the user equipment at least to:

receive, from a distributed unit of a radio access network, a layer 1 measurement reporting configuration and at least one activation condition for autonomous execution of the layer 1 reporting configuration; and cause said layer 1 measurement reporting configuration to be executed when at least one of the at least one activation condition is fulfilled, wherein the user equipment being caused to cause said layer 1 measurement reporting configuration to be executed comprises the user equipment being caused to signal, to the distributed unit, an indication that at least one of the at least one activation conditions has been fulfilled, wherein said layer 1 measurement reporting configuration comprises an instruction for the distributed unit to abstain from signalling the layer 1 measurement reporting configuration to the user equipment before the indication that at least one of the at least one activation conditions is fulfilled is received from the user equipment.

12. The user equipment as claimed in claim 11, wherein causing the user equipment being caused to cause said layer 1 measurement reporting configuration to be executed when at least one of the at least one activation condition is fulfilled comprises the user equipment being caused to autonomously signalling signal said at least one layer 1 measurement report after at least one of the at least one activation conditions has been fulfilled.

13. The user equipment as claimed in claim 11, wherein causing the user equipment being caused to cause said layer 1 measurement reporting configuration to be executed when at least one of the at least one activation condition is fulfilled further comprises the user equipment being caused to:

receiving receive a trigger from the distributed unit that causes the user equipment to execute said layer 1 measurement reporting configuration.

14. A user equipment, comprising at least one processor and at least one memory including computer code for one or more programs, the at least one memory and the computer code configured, with the at least one processor, to cause the user equipment at least to:

receive, from a distributed unit of a radio access network, a layer 3 measurement reporting configuration and at least one activation condition for indicating that a layer 1 reporting configuration is to be executed;

determine that at least one of said at least one activation condition is fulfilled; and signal a layer 3 measurement report with an indication that at least one of the at least one activation condition is fulfilled.

15. The user equipment as claimed in claim 14, the user equipment being further configured to receive, from the distributed unit, physical uplink control channel resources for layer 1 measurement reporting with at least one of:

said layer 1 measurement reporting configuration; or an instruction to activate, at the user equipment, a previously signalled layer 1 measurement reporting configuration.

16. The user equipment as claimed in claim 14, wherein layer 3 and layer 1 measurement reporting configurations are comprised in a same message.

17. The user equipment as claimed in claim 14, wherein the at least one activation condition comprises at least one of:

a property of the serving cell is determined to become better than a first threshold;

a property of the serving cell is determined to become worse than a second threshold;

a neighbor cell is determined to become offset better than serving cell;

a neighbor cell is determined to become better than an offset;

a property of the serving cell is determined to become worse than a third threshold and said property of a neighbor cell is determined to become better than a fourth threshold;

a property of a neighbor cell is determined to become better than a fifth threshold;

a property of an inter-Radio Access Technology (RAT) neighbor is determined to become better than a sixth threshold;

a property of a Primary Cell (PCell) is determined to become worse than a seventh threshold, and said property of an inter RAT neighbor is determined to become better than an eighth threshold;

a measured interference is determined to become higher than a ninth threshold;

coordinates of the user equipment are determined to be a tenth threshold distance (or more) away from coordinate 1, and an eleventh threshold (or less) distance closer from the coordinate 2; and/or a timer of the user equipment is determined to be later than a configured universal time coordinated timer.

* * * * *